United States Patent
Stone et al.

(10) Patent No.: US 8,284,238 B2
(45) Date of Patent: Oct. 9, 2012

(54) IMAGE PROCESSING APPARATUS AND METHOD

(75) Inventors: Jonathan James Stone, Reading (GB); Robert Mark Stefan Porter, Winchester (GB); Clive Henry Gillard, Alton (GB)

(73) Assignee: Sony Corporation, Tokyo (JP)

( * ) Notice: Subject to any disclaimer, the term of this patent is extended or adjusted under 35 U.S.C. 154(b) by 1007 days.

(21) Appl. No.: 12/204,417

(22) Filed: Sep. 4, 2008

(65) Prior Publication Data

US 2009/0066784 A1    Mar. 12, 2009

(30) Foreign Application Priority Data

Sep. 5, 2007  (GB) .................................. 0717272.9

(51) Int. Cl.
*H04N 13/02* (2006.01)
(52) U.S. Cl. .......................................... 348/46; 348/700
(58) Field of Classification Search .................... 348/46, 348/700
See application file for complete search history.

(56) References Cited

U.S. PATENT DOCUMENTS

| | | | | |
|---|---|---|---|---|
| 5,491,517 A * | 2/1996 | Kreitman et al. | ............. | 348/581 |
| 6,072,903 A * | 6/2000 | Maki et al. | ..................... | 382/190 |
| 6,104,439 A * | 8/2000 | Jeong et al. | ..................... | 348/699 |
| 6,661,914 B2 * | 12/2003 | Dufour | .......................... | 382/154 |
| 6,970,591 B1 * | 11/2005 | Lyons et al. | .................. | 382/154 |
| 7,675,520 B2 * | 3/2010 | Gee et al. | ...................... | 345/473 |
| 7,847,844 B2 * | 12/2010 | Takemoto et al. | ............ | 348/286 |
| 2002/0113878 A1 * | 8/2002 | Iwai et al. | ..................... | 348/187 |
| 2004/0155965 A1 * | 8/2004 | Jaynes et al. | .................. | 348/189 |
| 2007/0285554 A1 * | 12/2007 | Givon | .......................... | 348/340 |
| 2009/0009593 A1 * | 1/2009 | Cameron et al. | ................ | 348/51 |
| 2010/0194862 A1 * | 8/2010 | Givon | ............................ | 348/49 |

FOREIGN PATENT DOCUMENTS

| | | |
|---|---|---|
| JP | 11-149575 | 6/1999 |
| JP | 2002-518722 | 6/2002 |
| JP | 2004-221870 | 8/2004 |
| WO | WO 98/46029 | 10/1998 |
| WO | WO 01/49028 A1 | 7/2001 |

OTHER PUBLICATIONS

U.S. Appl. No. 12/204,447, filed Sep. 4, 2008, Gillard, et al.

(Continued)

*Primary Examiner* — Phuoc Nguyen
(74) *Attorney, Agent, or Firm* — Oblon, Spivak, McClelland, Maier & Neustadt, L.L.P.

(57) ABSTRACT

An image processing apparatus and a method for generating a three dimensional representation of a scene, which includes a plurality of objects disposed on a plane, is disclosed. The three dimensional representation is generated from one or more video images of the scene, which include the objects on the plane produced from a view of the scene by a video camera. The method includes processing the captured video images to extract image features from each object, comparing image features with sample image features from a predetermined set of possible example objects, and identifying the objects from the comparison of the image features with the sample image features. The method also includes generating object path data, which includes object identification data for each object which identifies the respective object; and provides a position of the object on the plane in the video images with respect to time.

19 Claims, 16 Drawing Sheets

OTHER PUBLICATIONS

Naho Inamoto, et al., "Immersive Observation of Virtualized Soccer Match at Real Stadium Model", Proceedings of the Second IEEE and ACM International Symposium on Mixed and Augmented Reality, Oct. 7-10, 2003, 10 pages.

Thomas Bebie, et al., "SoccerMan—Reconstructing Soccer Games from Video Sequences", Computer Graphics Forum, vol. 19. Issue 3, Sep. 2000, pp. 898-902.

Japanese Office Action dated Jun. 19, 2012.

Yoshinori Ohno et al, "Tracking Players and a Ball in Soccer Games," Dept. of Mechanical Engineering for Computer-Controlled Machinery, Osaka University, Jan. 21 (22), 1999, vol. 99, No. 3, pp. 49-56 (with Partial Translation of pertinent parts).

* cited by examiner

IMAGE PROCESSING APPARATUS AND METHOD

CROSS REFERENCE TO PRIORITY APPLICATION

The present application contains subject matter related to United Kingdom patent application number 0717272.9 filed in the United Kingdom Intellectual Property Office on Sep. 5, 2007, the entire contents of which being incorporated herein by reference.

FIELD OF THE INVENTION

The present invention relates to image processing apparatus for and methods of generating a three dimensional representation of a scene which includes a plurality of objects disposed on a plane, the three dimensional representation being generated from one or more video images of the scene captured by a video camera, which video images include a view of the objects on the plane.

BACKGROUND OF THE INVENTION

Video images of live events such as sporting events can be adapted to embellish the images by adding graphical features or effects to the images, which can be superimposed on a field of play. For example, advertisements or club emblems of teams which are playing each other in a football match, for example, can be superimposed on an image of the football pitch which is captured by a camera, so that it appears that the players are playing on top of the images of the emblems which are superimposed on the football pitch. Similarly, a player can be tracked manually throughout a passage of play, and a tracking graphic can be superimposed manually on a player of interest manually, to highlight the performance of that player.

In order to improve a viewer's experience of an event on video screen such as on a television, several cameras can be used and positioned around a sporting stadium to view the event from different positions and angles. Furthermore, so called player cams can be used to concentrate on capturing the actions of particular players. However, cameras are expensive and deploying several cameras to cover an event can be expensive and furthermore integrating the video images produced by each camera can represent a complex task. Furthermore, how ever many cameras are employed, there may still be a requirement to view an event from a position at which there is no camera.

SUMMARY OF THE INVENTION

In a first aspect, there is provided a method of generating a three dimensional representation of a scene which includes a plurality of objects disposed on a plane. The three dimensional representation is generated from one or more video images of the scene, which include the objects on the plane produced from a view of the scene by a video camera. The method comprises processing the captured video images so as to extract one or more image features from each object, comparing the one or more image features with sample image features from a predetermined set of possible example objects, which the video images may contain, and identifying the objects from the comparison of the image features with the stored image features of the possible example objects. The method includes generating object path data, which includes object identification data for each object which identifies the respective object; and provides a position of the object on a three dimensional model of the plane in the video images with respect to time. The method further includes calculating a projection matrix for projecting the position of each of the objects according to the object path data from the plane into the three dimensional model of the plane. As such, in some exampled the three dimensional representation of the scene which includes a synthesised representation of each of the plurality of objects on the plane can be generated, by projecting the position of the objects according to the object path data into the plane of the three dimensional model of the scene using the projection matrix and a predetermined assumption of the height of each of the objects. As an alternative to an assumption of the height of each of the objects, an assumption of a simulated distance of a camera viewing the three dimensional representation can be used, or a combination thereof.

Embodiments of the present invention can generate a three dimensional model from video images of, for example, a live football match. As such, a change in a relative view of the generated three dimensional model can be made, so that a view can be provided in the three dimensional model of the scene at a view point at which no camera is actually present in the real world for which video images of the live scene are captured. Thus, the three dimensional model of the scene provides a virtual representation of a real scene, which can be manipulated to change a view of that model in three dimensions. Furthermore, the three dimensional model can be created from video images, which have been generated by a single camera although more than one camera can be used.

In some embodiments, an indication of a relative orientation of the object in the plane is generated for each object, which is included in the object path data. As such, when generating the three dimensional model, which reflects the movement of the objects, such as the players on a football pitch, then each of the synthesised objects can be orientated in the plane in the model using the indication of the relative orientation identified from the video images. As such a more realistic representation can be produced by the three dimensional model of the scene. In other examples, where the scene is that of a football match, for example, in which the football pitch provides the plane in the scene and the players are the objects, other attributes of the players can be logged, such as an indication of a relative attitude, posture or demeanour. As a result, when generating the three dimensional model, the indication of the relative attitude, posture or demeanour can be used to select from one of a possible set of representations of each player, each of the representations in the set corresponding to one of the possible indications of the relative attitude, posture or demeanour. Therefore, an improvement can be provided in an extent to which the three dimensional model reflects the real scene.

Embodiments of the present invention can be used to create a synthesised representation of a three dimensional model of a scene such as a sporting event, which can be used to create a computer game or simulation, which reflects the real sporting event.

In some embodiments, the method includes identifying each of the objects in the video images using the object path data with respect to the three dimensional model of the plane on which the objects are disposed. From the identification, the method includes generating a graphical representation of an identifier which identifies each of the objects in the video images, and overlaying the identifier on the objects in the video images to the effect that one or more of the objects is provided with an identifier as the objects move on the plane in the video images. As such, having tracked the objects using the three dimensional model of the plane on which the objects are disposed, the relative position of the identified objects are projected back into the video images and a graphical label or identifier or other effect introduced, so that identifiers of the players can be viewed in the video images.

Various further aspects and features of the present invention are defined in the appended claims, which include an image processing apparatus and a data carrier having a recordable medium on which there is recorded information signals representing a computer program for performing the method according to any of the appended claims.

BRIEF DESCRIPTION OF THE DRAWINGS

Embodiments of the present invention will now be described by way of example with reference to the accompanying drawings, in which.

DESCRIPTION OF EXAMPLE EMBODIMENTS

A system and method of object tracking is disclosed. In the following description, a number of specific details are presented in order to provide a thorough understanding of embodiments of the present invention. It will be apparent however to a person skilled in the art that these specific details need not be employed to practice the present invention. Conversely, specific details known to the person skilled in the art are omitted for the purposes of clarity in presenting the embodiments.

Figure 1:
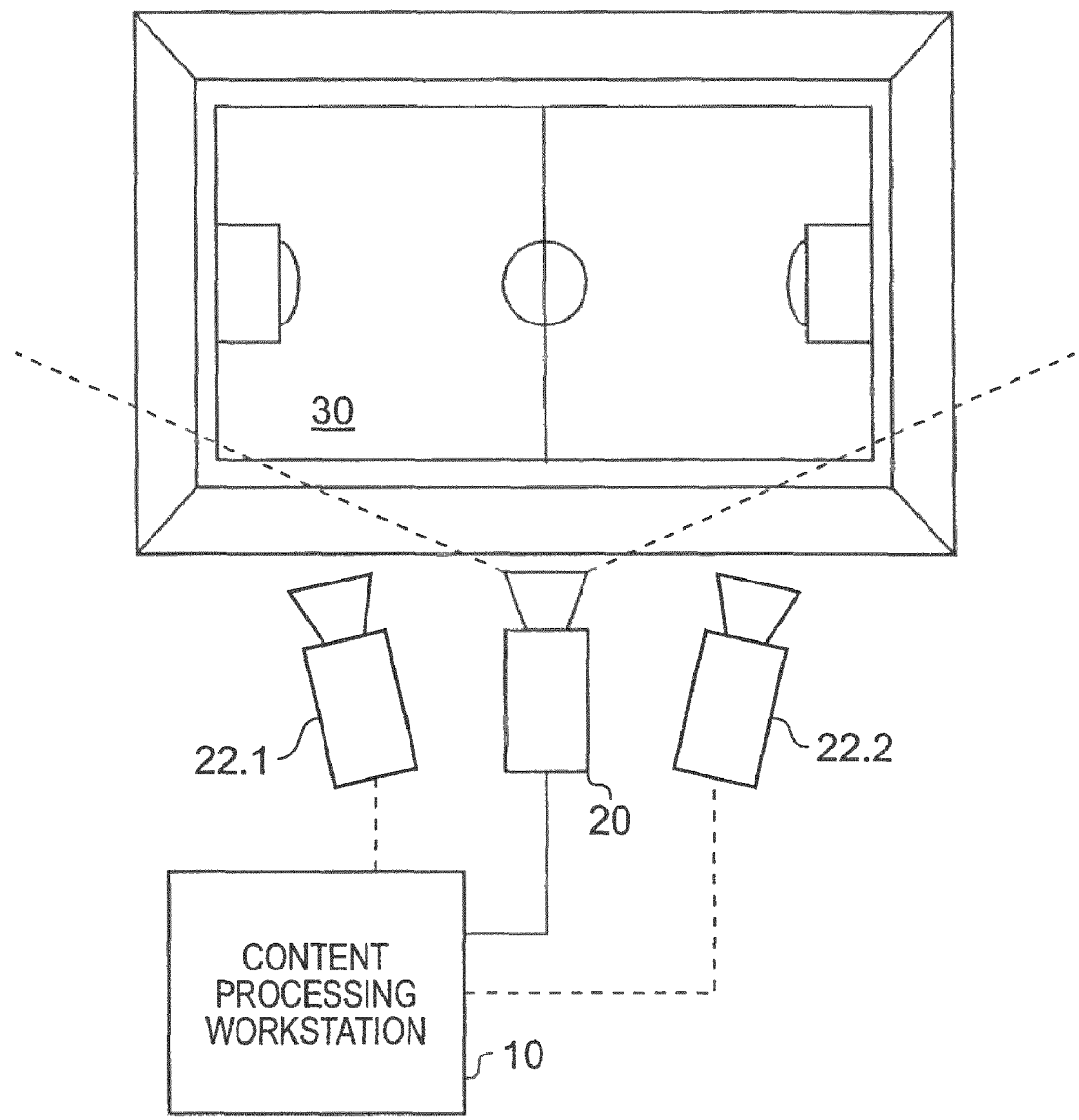
FIG. 1 is a schematic diagram of an object tracking system in accordance with an embodiment of the present invention.

FIG. 1 shows a schematic diagram of an object tracking system in accordance with embodiments of the present invention. In the embodiment shown in FIG. 1, the objects to be tracked are football players (not shown) on a football pitch 30. High definition (HD) video images (1920 by 1080 pixels) of the pitch 30 are captured by one or more high definition cameras. Although, embodiments of the present invention can be used to track objects in video images from more than one camera, in some examples only a single camera is used. As will be appreciated, HD cameras are expensive, so that using only a single camera can reduce an amount of expense required to implement systems which utilise the present technique. However, using only a single camera provides only a single two dimensional view of a scene within which the objects are disposed. As a result tracking of the objects within the scene represented by the video images can be more difficult, because occlusion events, in which one object obscures another are more likely. Such a single camera 20 example is shown in FIG. 1, although as illustrated by camera 22.1, 22.2 optionally two cameras can be used, each pointing at a different half of the football pitch.

In FIG. 1, a video camera 20 is disposed at a fixed point within the football stadium and arranged to communicate signals representing video images captured by the camera 20 to a content processing workstation 10, which carries out image processing and other operations so as to track the position of the players on the pitch with respect to time. Data representing the position of the players with respect to time is then logged so that metadata and match statistics can be generated such as the length of time a particular player spent in a particular part of the pitch, how far each player ran and the like. The data representing the position of the players with respect to time forms path data for each player, which relates to the path that each player has taken within the video images. The path data is generated with respect to a three dimensional model of the football pitch (object plane) in order to provide information associated with movement of the players with respect to their position on the pitch, which are not readily apparent from the (two dimensional) video images. This generated path data can then be used to enhance a viewing experience for a viewer when footage of the football match is transmitted via a suitable medium to the viewer or to assist a coach when coaching the football team. The tracking of objects such as players on the pitch 30 will be described in more detail below.

In embodiments of the present invention, the content processing workstation 10 uses a Cell processor jointly developed by Sony®, Toshiba® and IBM®. The parallel nature of the Cell processor makes it particularly suitable for carrying out computationally intensive processing tasks such as image processing, image recognition and object tracking. However, a skilled person will appreciate that any suitable workstation and processing unit may be used to implement embodiments of the present invention.

It will be appreciated that the system and method of object tracking according to embodiments of the present invention need not be limited to tracking players on a football pitch. For example, players of other team sports such as rugby, cricket, American football, ice hockey, basketball and the like could be tracked. Additionally, objects such as balls, ice hockey pucks or vehicles such as racing cars and the like may be tracked in accordance with embodiments of the present invention.

According to the present technique, the video images, which are generated using the HD video camera 20 are arranged to capture the view of the whole pitch, so that the players on the pitch can be tracked. Thus the whole pitch is captured from a static position of the camera 20, although as mentioned above, more than one camera could be used, in order to capture the whole pitch. In one example, as mentioned above, the two cameras 22.1, 22.2 may be used each of which is directed at different halves of the pitch. In this example, the video images generated by each camera may be stitched together by the content processing workstation 10 as described in United Kingdom Patent Application No. 0624410.7 so as to form ultra high resolution video images. In this embodiment, after undergoing the stitching process, the output from the camera cluster can be thought of as a single ultra-high resolution image.

The advantages of the ultra-high definition arrangement are numerous including the ability to highlight particular features of a player without having to optically zoom and therefore affecting the overall image of the stadium. Furthermore, the automatic tracking of an object is facilitated because the background of the event is static and there is a higher screen resolution of the object to be tracked.

Object tracking in accordance with embodiments of the present invention will now be described with reference to FIGS. 2, 3 and 4.

Figure 2:
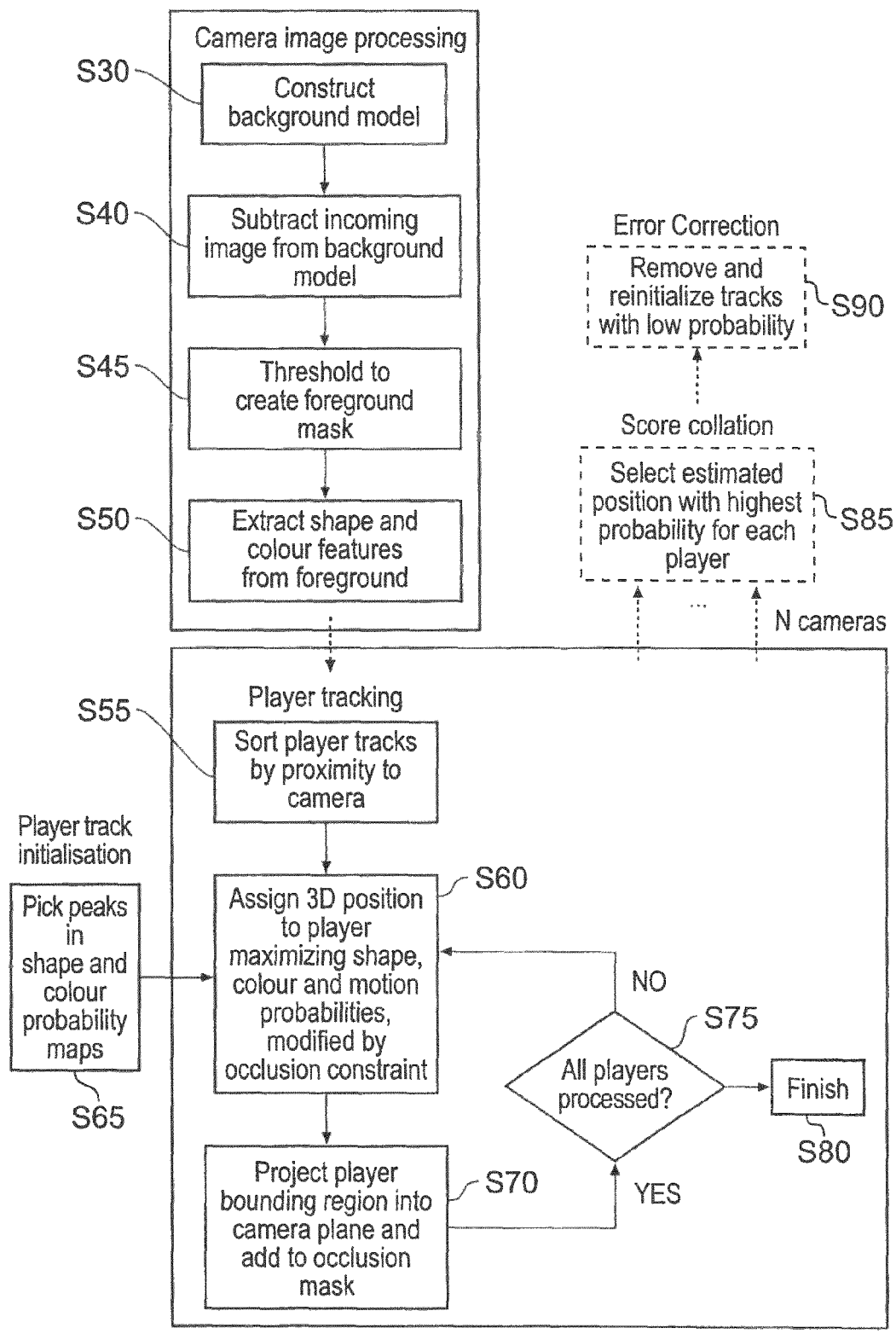
FIG. 2 is a flow diagram of a method of object tracking in accordance with embodiments of the present invention.

FIG. 2 shows a flowchart of a method of object tracking in accordance with embodiments of the present invention. In order to track an object, a background model is constructed from those parts of the received video that are detected as being substantially static over a predetermined number of frames. In a first step S30 the video image received from the camera 20, which represents the football pitch is processed to construct the background model of the image. The background model is constructed in order to create a foreground mask which assists in identifying and tracking the individual players. The background model is formed at step S30 by determining for each pixel a mean of the pixels and a variance of the pixel values between successive frames in order to build the background model. Thus, in successive frames where the mean value of the pixels do not change greatly then these pixels can be identified as background pixels in order to identify the foreground mask.

Such a background/foreground segmentation is a process which is known in the field of image processing and the present technique utilises an algorithm described in document by Manzanera and Richefeu, and entitled "A robust and Computationally Efficient Motion Detection Algorithm Based on Σ-Δ Background Estimation", published in proceedings ICVGIP, 2004. However, the present technique should not be taken as being limited to this known technique and other techniques for generating a foreground mask with respect to a background model for use in tracking are also known.

It will be appreciated that, in the case where the field of view of the video camera encompasses some of the crowd, the crowd is unlikely to be included in the background model as they will probably be moving around. This is undesirable because it is likely to increase a processing load on the Cell processor when carrying out the object tracking as well as being unnecessary as most sports broadcasters are unlikely to be interested in tracking people in the crowd.

In an embodiment of the present invention, the background model is constructed at the start of the game and can even be done before players come onto the pitch. Additionally, the background model can be recalculated periodically throughout the game so as to take account of any changes in lighting condition such as shadows that may vary throughout the game.

In step S40, the background model is subtracted from the incoming image from the camera to identify areas of difference. Thus the background model is subtracted from the image and the resultant image is used to generate a mask for each player. In step S45, a threshold is created with respect to the pixel values in a version of the image which results when the background model has been subtracted. The background model is generated by first determining the mean of the pixels over a series of frames of the video images. From the mean values of each of the pixels, the variance of each of the pixels can be calculated from the frames of the video images. The variance of the pixels is then used to determine a threshold value, which will vary for each pixel across all pixels of the video images. For pixels, which correspond to parts of the image, where the variance is high, such as parts which include the crowd, the threshold can be set to a high value, whereas the parts of the image, which correspond to the pitch will have a lower threshold, since the colour and content of the pitch will be consistently the same, apart from the presence of the players. Thus, the threshold will determine whether or not a foreground element is present and therefore a foreground mask can correspondingly be identified. In step S50 a shape probability based on a correlation with a mean human shape model is used to extract a shape within the foreground mask. Furthermore, colour features are extracted from the image in order to create a colour probability mask, in order to identify the player, for example from the colour of the player's shirt. Thus the colour of each team's shirts can be used to differentiate the players from each other. To this end, the content processing workstation 10 generates colour templates in dependence upon the known colours of each football team's team kit. Thus, the colour of the shirts of each team is required, the colour of the goal keeper's shirts and that of the referee. However, it will be appreciated that other suitable colour templates and/or template matching processes could be used.

Returning to FIG. 2, in step S50 the content processing workstation 10 compares each of the pixels of each colour template with the pixels corresponding to the shirt region of the image of the player. The content processing workstation then generates a probability value that indicates a similarity between pixels of the colour template and the selected pixels, to form a colour probability based on distance in hue saturation value (HSV) colour space from team and pitch colour models. In addition, a shape probability is used to localise the players, which is based on correlation with a mean human shape model, Furthermore, a motion probability is based on distance from position predicted by a recursive least-squares estimator using starting position, velocity and acceleration parameters.

Figure 3A:
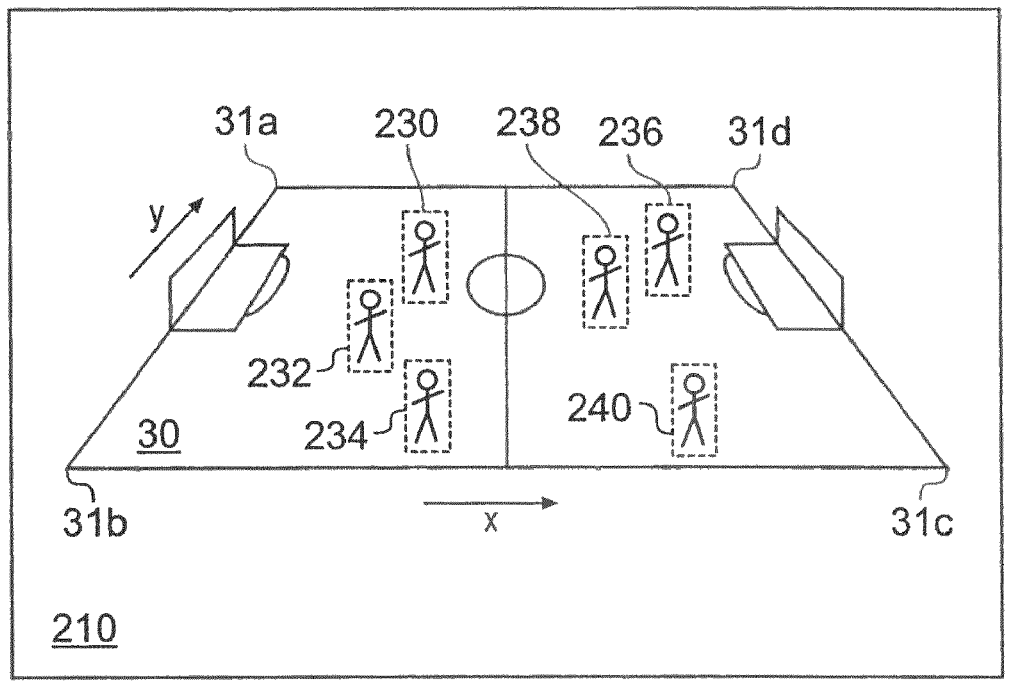
FIGS. 3A and 3B are schematic diagrams of object tracking in accordance with an embodiment of the present invention.

The creation of player masks is illustrated in FIG. 3A. FIG. 3A shows a camera view 210 of the football pitch 30 generated by the video camera 20. As already explained, the pitch 30 forms part of the background model, whilst the players 230, 232, 234, 236, 238, 240 should form part of the foreground mask as described above. Player bounding boxes are shown as the dotted lines around each player.

Thus far the steps S30, S40, S45 and S50 are performed with a respect to the camera image processing. Having devised the foreground mask, player tracking is performed after first sorting the player tracks by proximity to the camera in step S55. Thus, the players which are identified as being closest to the camera are processed first in order to eliminate these players from the tracking process. At step S60, player positions are updated so as to maximise shape, colour and motion probabilities. In step S70 an occlusion mask is constructed that excludes image regions already known to be covered by other closer player tracks. This ensures that players partially or wholly occluded by other players can only be matched to visible image regions. The occlusion mask improves tracking reliability as it reduces the incidence of track merging (whereby two tracks follow the same player after an occlusion event). This is a particular problem when many of the targets look the same, because they cannot be (easily) distinguished by colour. The occlusion mask allows pixels to be assigned to a near player and excluded from the further player, preventing both tracks from matching to the same set of pixels and thus maintaining their separate identities.

Figure 3B:
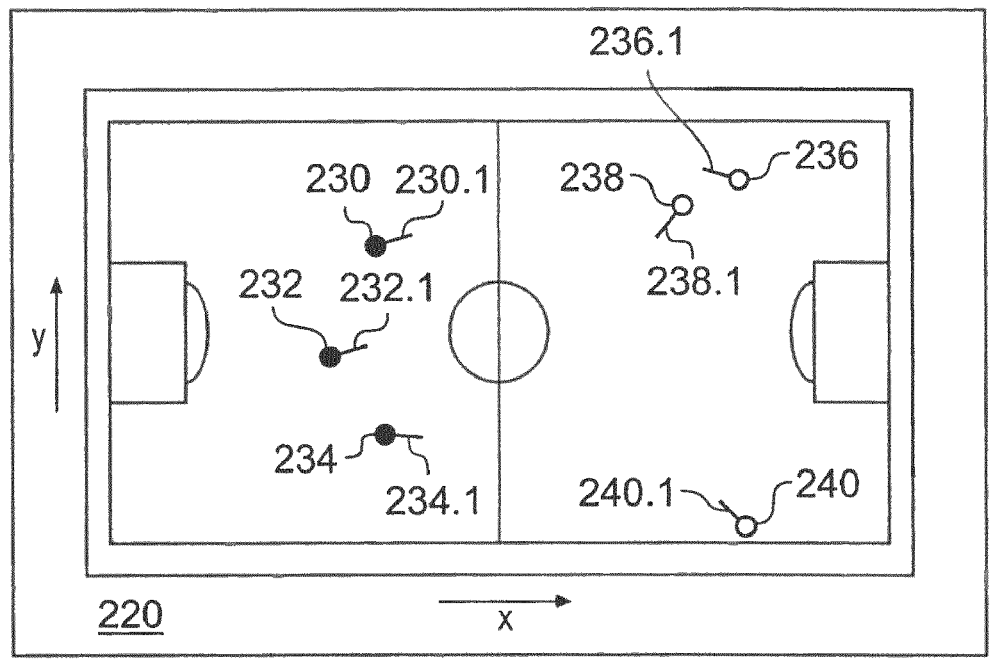

There then follows a process of tracking each player by extracting the features provided within the camera image and mapping these onto a 3D model as shown in FIGS. 3A and 3B. Thus, for corresponding a position within the 2D image produced by the camera, a 3D position is assigned to a player which maximises shape, colour and motion probabilities. As will be explained shortly, the selection and mapping of the player from the 2D image onto the 3D model will be modified should an occlusion event have been detected. To assist the mapping from the 2D image to the 3D model in step S65 the players to be tracked are initialised to the effect that peaks in shape and colour probability are mapped onto the most appropriate selection of players. It should be emphasised that the initialisation, which is performed at step S65 is only performed once, typically at the start of the tracking process. For a good initialisation of the system, the players should be well separated. After initialisation any errors in the tracking of the players are corrected automatically in accordance with the present technique, which does not require manual intervention.

In order to effect tracking in the 3D model from the 2D image positions, a transformation is effected by use of a projection matrix P. Tracking requires that 2D image positions can be related to positions within the 3D model. This transformation is accomplished by use of a projection (P) matrix. A point in 2D space equates to a line in 3D space:

$$\begin{bmatrix} x \\ y \\ 1 \end{bmatrix} = \begin{bmatrix} P_{00} & P_{01} & P_{02} & P_{03} \\ P_{10} & P_{11} & P_{12} & P_{13} \\ P_{20} & P_{21} & P_{22} & P_{23} \\ 0 & 0 & 0 & 1 \end{bmatrix} \begin{bmatrix} x' \\ y' \\ z' \\ w' \end{bmatrix}$$

A point in a 2D space equates to a line in a 3D space because a third dimension, which is distance from the camera, is not known and therefore would appear correspondingly as a line across the 3D model. A height of the objects (players) can be used to determined the distance from the camera. A point in 3D space is gained by selecting a point along the line that lies at a fixed height above the known ground level (the mean human height). The projection matrix P is obtained a priori, once per camera before the match by a camera calibration process in which physical characteristics of the pitch such as the corners 31A, 31B, 31C, 31D of the pitch 30 are used to determine the camera parameters, which can therefore assist in mapping the 2D position of the players which have been identified onto the 3D model. This is a known technique, using established methods. In terms of physical parameters, the projection matrix P incorporates the camera's zoom level, focal centre, 3D position and 3D rotation vector (where it is pointing).

The tracking algorithm performed in step S60 is scalable and can operate on one or more cameras, requiring only that all points on the pitch are visible from at least one camera (at a sufficient resolution).

In addition to the colour and shape matching, step S60 includes a process in which the motion of the player being tracked is also included in order to correctly identified each of the players with a greater probability. Thus the relevant movement of players between frames can be determined both in terms of a relevant movement and in a direction. Thus, the relative motion can be used for subsequent frames to produce a search region to identify a particular player. Furthermore, as illustrated in FIG. 3B, the 3D model of the football pitch can be augmented with lines 230.1, 232.1, 234.1, 236.1, 238.1, and 240.1 which are positioned relative to the graphic indication of the position of the players to reflect the relative direction of motion of the players on the football pitch.

At step S70, once the relative position of the players has been identified in the 3D model then this position is correspondingly projected back into the 2D image view of the football pitch and a relative bound is projected around the player identified from its position in the 3D model. Also at step S70, the relative bound around the player is then added to the occlusion mask for that player.

FIG. 3B shows a plan view of a virtual model 220 of the football pitch. In the embodiment shown in FIG. 3B, the players 230, 232, and 234 (on the left hand side of the pitch) have been identified by the content processing workstation 10 as wearing a different coloured football shirt from the players 236, 238, and 240 (on the right hand side of the pitch) thus indicating that they are on different teams. Differentiating the players in this way makes the detection of each player after an occlusion event easier as they can easily be distinguished from each other by the colour of their clothes.

Referring back to FIG. 2, at a step s60, the position of each player is tracked using known techniques such as Kalman filtering although it will be appreciated that other suitable techniques may be used. This tracking takes place both in the camera view 210 and the virtual model 220. In an embodiment of the present invention, velocity prediction carried out by the content processing workstation 10 using the position of the players in the virtual model 220 is used to assist the tracking of each player in the camera view 210.

Steps S60 and S70 are repeated until all players have been processed as represented by the decision box S75. Thus, if not all players have been processed then processing proceeds to step S60 whereas if processing has finished then the processing terminates at S80.

As shown in FIG. 2, the method illustrated includes a further step S85, which may be required if images are produced by more than one camera. As such, the process steps S30 to S80 may be performed for the video images from each camera. As such, each of the players will be provided with a detection probability from each camera. Therefore, according to step S85, each of the player's positions is estimated in accordance with the probability for each player from each camera, and the position of the player estimated from the highest of the probabilities provided by each camera, so that the position with the highest probability for each player is identified as the location for that player.

If it has been determined that an error has occurred in the tracking of the players on the football pitch then the track for that player can be re-initialised in step S90. The detection of an error in tracking is produced where a probability of detection of a particular player is relatively low for a particular track and accordingly, the track is re-initialised.

A result of performing the method illustrated in FIG. 2 is to generate path data for each player, which provides a position of the player in each frame of the video image, which represents a path that that player takes throughout the match. Thus the path data provides position with respect to time.

Occlusion Tracking

Figure 4:
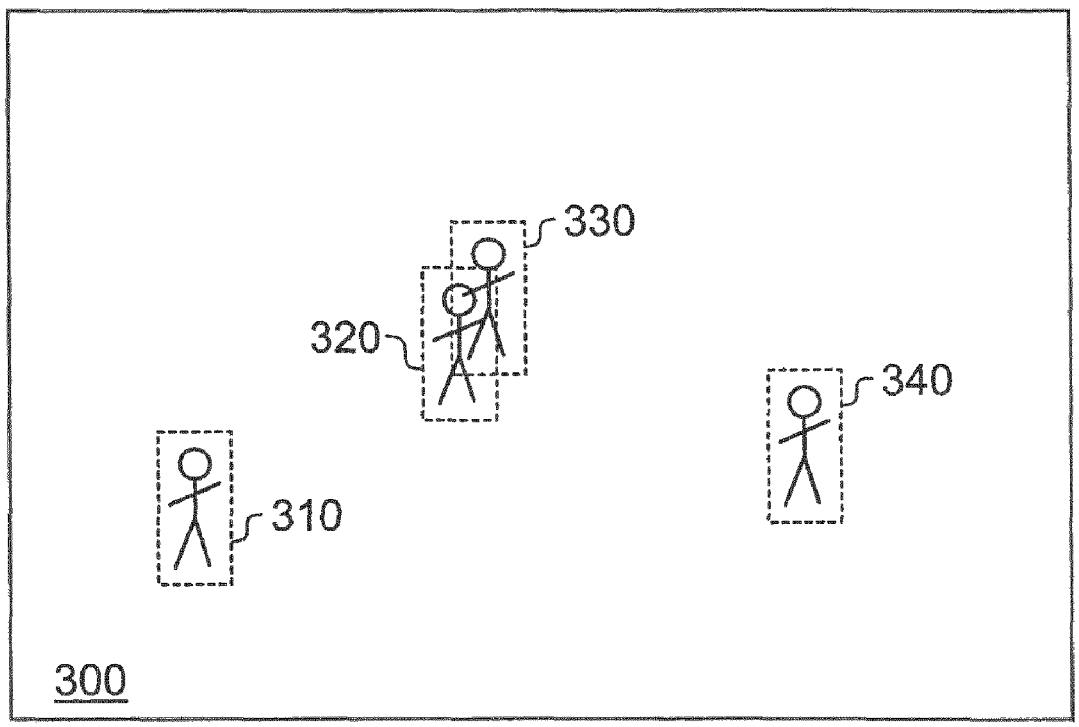
FIG. 4 is a schematic diagram of occlusion detection in accordance with an embodiment of the present invention.

A problem may arise when tracking the position of each player form a single camera view if one player obscures a whole or part of another player as illustrated in FIG. 4.

FIG. 4 shows a plurality of players 310, 320, 330, and 340 and their associated bounding boxes as indicated by the dashed lines around each player. Whilst the players 310 and 340 are clearly distinguishable from each other, player 320 obscures part of player 330. This is a so called occlusion event. An occlusion event can occur when all or part of one player obscures all or part of at least one other player with the effect that the tracking of the players becomes ambiguous, even after other factors, such as a relative motion and direction of the players is taken into account. However, it will be appreciated that occlusion events in which two or more players are involved may occur.

To detect an occlusion event, the content processing workstation 10 detects whether all or part of a mask associated with a player occurs in the same image region as all or part of a mask associated with another player as shown in FIG. 4. In the case where players involved in an occlusion event are on opposing teams and thus have different coloured shirts, they may easily be distinguished and tracked accordingly. However, after the occlusion event, if the players are both on the same side, the content processing workstation 10 may not be able to distinguish which player is which, particularly because their motion after an occlusion event, which was caused for example by a collision, may not be predictable and therefore may not track the players correctly. As a result, a tracking path assigned to each player may become swapped.

In order to resolve an ambiguity in the players tracked, the content processing workstation 10 labels all players involved in the occlusion event with the identities of all those players involved in the occlusion event. Then, at a later time, if one or more of the players become easily distinguishable, the content processing workstation 10 uses this information to reassign the identities of the players to the correct players so as to maintain a record of which player was which. This process is described in more detail with reference to FIG. 5.

Figure 5:
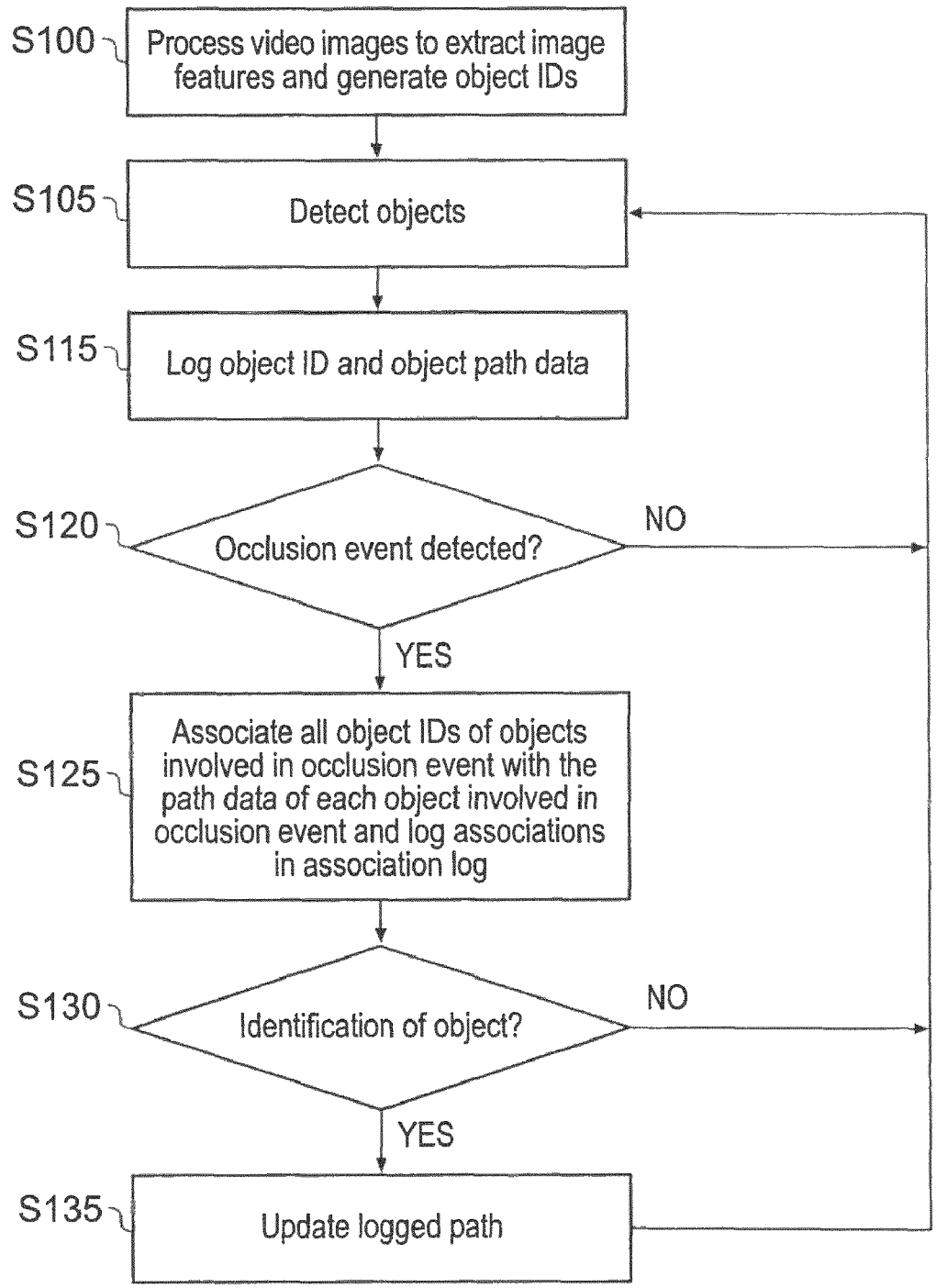
FIG. 5 is a flow diagram of a method of object tracking an occlusion detection in accordance with an embodiment of the present invention.

FIG. 5 shows a flow diagram of a method of object tracking and occlusion detection in accordance with embodiments of the present invention.

At a step s100, the content processing workstation carries out image processing on the captured video images so as to extract one or more images features as described above with reference to FIG. 2 above. The extracted image features are then compared with corresponding image features that are extracted from possible examples of the objects so as to identify each object. In an embodiment of the present invention, players are identified from the number on the shirt as will be described in more detail below with reference to FIGS. 7 and 8. The content processing workstation then generates object identification for each object which identifies each object. Alternatively, in an embodiment of the present invention, each object (e.g. a player) is identified by an operator via an operator interface. The content processing workstation 10 then uses the data input from the operator interface to generate the object identification data. However, it will be appreciated by the skilled person that image recognition techniques could be combined with identification by the operator so as to generate the object identification data or that other suitable object identification methods could be used, such as number recognition, which identifies the players by the numbers on the back of their shirts.

At a step s105, the content processing workstation 10 detects any objects to be detected such as the players as described with reference to FIG. 2 above in dependence upon the one or more image features extracted at the step s100. As was mentioned above, each player is also tracked using both the virtual model 220 and the camera view 210. The content processing workstation 10 uses the data generated during the tracking process to generate and store object path data that describes the path that each object takes within the received video images. The object path data takes the form of a sample of the x-y coordinates of the player with respect to time. In an embodiment of the present invention, the path data has the format $(t_i, x_i, y_i)$, where $t_i$ is the sample time, and $x_i$ and $y_i$ are the x and y coordinates of the object at the sample time $t_i$. However, it will be appreciated that other suitable path data formats could be used.

At the step s115, the content processing workstation 10 logs the object identification data for each object together with object path data which relates to the path that each object has taken within the video images. The logged data is stored on a hard disk drive (HDD) or in dynamic random access memory (DRAM) of the content processing workstation 10. This allows a record to be kept of which player was associated with each detected and tracked path. The logged data can then be used to generate data about each player and where they were during the match. For example, the time that a player spent in a particular area of the pitch could be generated from the data stored in the association log. Furthermore, if for any reason the association between the player and the path becomes ambiguous, for example as might happen after an occlusion event, a record of this can be kept until the ambiguity is resolved as described below. An example of the logged object identification data together with the object path data is shown in Table 1 below.

TABLE 1

| ObjectID | t | x | y |
|---|---|---|---|
| A | $t_1$ | $x_1$ | $y_1$ |
| A | $t_2$ | $x_2$ | $y_2$ |
| A | $t_3$ | $x_3$ | $y_3$ |
| . | . | . | . |
| . | . | . | . |
| . | . | . | . |
| A | $t_i$ | $x_i$ | $y_i$ |

The association between the object identification data for each object and the object path data for that object allows each object to be tracked and identified accordingly. In the embodiments described above, each player may be tracked, therefore allowing a broadcaster to know which player is which even though that player might be too far away to be visually identified by an operator or by image recognition carried out by the content processing workstation 10. This allows a broadcaster to incorporate further features and information based on this association that a viewer of the broadcast content might find desirable. Further examples of displaying the tracked data in the image view will be described later.

At a step s120, the content processing workstation 10 detects whether an occlusion event has occurred as described above with reference to FIG. 4. If no occlusion event is detected, then the process returns to the step s105 in which the objects are detected. In this way each object can be individually tracked and the path of each object uniquely associated with the identity of that object.

However, if an occlusion event is detected, then, at a step s125, the Cell processor associates the object identification data for each object involved in the occlusion event with the object path data for each object involved in the occlusion event. For example, if two objects labelled A and B are associated with paths P and Q respectively, after the detection of an occlusion event involving objects A and B, the path P will be associated with both A and B and the path Q will be associated with both A and B. The associations generated by the content processing workstation 10 after the occlusion event are then logged as described above. This allows the objects (e.g. players) involved in the occlusion event to be tracked without having to re-identify each object even if there is some uncertainty as to which player is which. Therefore, a processing load on the content processing workstation 10 is reduced as only those objects involved in the occlusion event are identified ambiguously, whilst objects not involved in the occlusion event can still be identified.

At a step s130, the content processing workstation 10 checks to see if an identification of one or more of the objects involved in the occlusion event has been made so that the identity of the objects associated with the generated paths can be resolved. The identification of at least one of the objects is carried out by the content processing workstation by comparing one or more image features associated with that object with the image features extracted from the possible examples of the objects. If no identification has been made, then the process passes to the step s105 with the generated path data for each object being associated with all those objects involved in the occlusion event.

However, if an identification of one or more of the objects involved in the occlusion event is detected to have occurred, then at a step s135, the logged path data is updated to reflect the identity of the object that was positively identified. In the example given above, the association log would be updated so that A is associated with path P, and B is associated with path Q.

Alternatively, an identification of an object may carried out by an operator via an operator interface, by the content processing workstation 10 using image recognition techniques in accordance with embodiments of the present invention (as described below) or by a combination of the two techniques. However, it will be appreciated that any other identification technique suitable to distinguish or identify each object could be used. In the case of image recognition the content processing workstation 10 may generate a confidence level that indicates how likely the identification made by the image recognition process is to be correct. In an embodiment of the present invention, an identification is determined to be where the confidence level is greater than a predetermined threshold. Additionally, an operator may assign a confidence level to their identification and, if that confidence level exceeds a predetermined threshold, then an identification is detected.

In embodiments of the present invention, a history of events indicating when the logged path data has been updated and this may also be stored so as to act as back-up in case the positive identification turns out to be incorrect. For example, an identification could turn out to be incorrect where an operator was convinced that a player that was far away from the video camera 20 had a particular identity but as the player came closer to the video camera (allowing the user to see a higher resolution image of the player), the operator realises they have been mistaken. In this case, they may use the operator interface to over-ride their previous identification of the player so as that the content processing workstation 10 can update the logged path data accordingly. In the example given above, an identification event history can be stored on a hard disk drive (HDD) or in dynamic random access memory (DRAM) of the content processing workstation 10 with data showing that, before the positive identification, the path P used to be associated with both A and B and the path Q used to be associated with both A and B.

The identification event history can also include the confidence level that was generated during the identification process. If a subsequent identification is made of an object that has a higher confidence level than that of a previous positive identification, then the confidence level of the subsequent identification can be used to verify or annul the previous identification.

It will be appreciated that after the detection of an occlusion event, an object may be identified at any time after the occlusion event so as to disambiguate the objects involved in the occlusion event. Therefore, after the detection of an occlusion event, the content processing workstation 10 can monitor whether a positive identification of an object has occurred as a background process that runs concurrently with the steps s105 to s125.

Some examples of object tracking and occlusion detection in accordance with embodiments of the present invention will now be described with reference to FIGS. 6a and 6b.

Figure 6A:
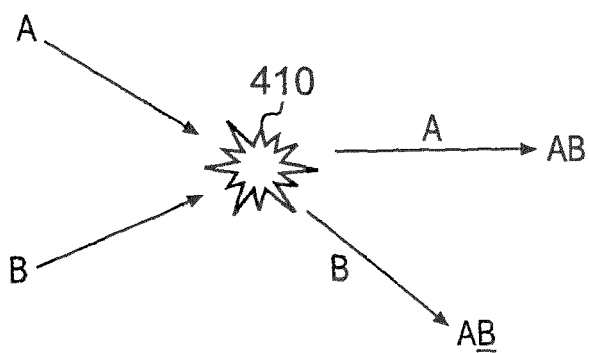
FIGS. 6A and 6B are schematic diagrams of object tracking and occlusion detection in accordance with an embodiment of the present invention.

In the example shown in FIG. 6a, two objects identified as A and B are involved in an occlusion event 410. After the occlusion event both detected object paths as indicated by the arrows are associated with both A and B (AB). Some time later, object B is positively identified as indicated by A$\overline{B}$ on the lower path. This identification is then used to update the association between the object and the paths so that object A is associated with the upper path after the occlusion event 410 and object B is associated with the lower path after the occlusion event 410.

Figure 6B:
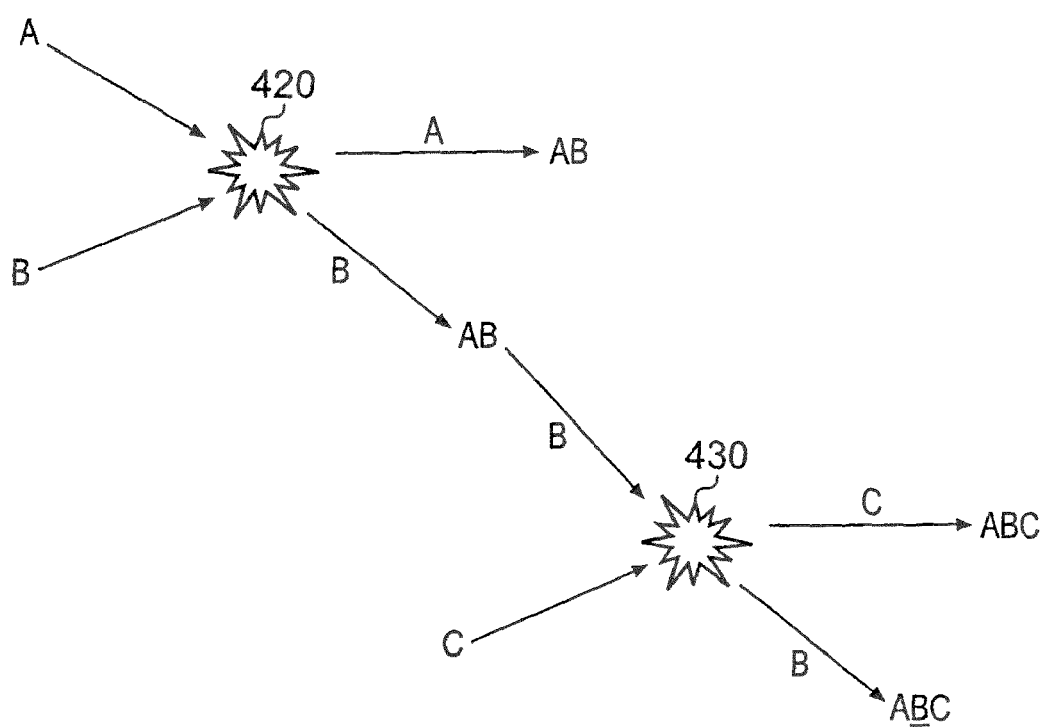

In the example shown in FIG. 6b, objects A and B are initially involved in an occlusion event 420. However, before the objects A and B can be positively identified, the object associated with both A and B on the lower path after the occlusion event 420 is involved in another occlusion event 430 with object C. Accordingly, before the occlusion event 430, it is unclear whether the object on the lower path after the occlusion event 420 is object A or object B. Therefore, after the occlusion event 430, both the upper and lower paths that the two objects follow are associated with the objects A, B and C (ABC).

At a later time, the object on the lower path after occlusion event 430 is positively identified as being object B (AB$\overline{C}$). Therefore, association log can be updated so that the upper path after occlusion event 430 is associated with object C. Furthermore, this information can be used to update the association log so that the two objects involved in the occlusion event 420 can be disambiguated as it must have been object B that was involved in the occlusion event 430 as object B was positively identified as being associated with the lower path after occlusion event 430. Accordingly, the association log can be updated so that the upper path after the occlusion event 420 is associated with the object A and the lower path after occlusion event 420 associated with object B.

Therefore, embodiments of the present invention allow objects to be associated with tracked paths of objects even though several occlusion events may have occurred before an object is positively identified. Furthermore, embodiments of the present invention allow the identities of the different objects to be cross referenced with each other so as to allow each path to be associated with the correct object.

Number Recognition

A method of identifying objects in accordance with embodiments of the present invention will now be described with reference to FIG. 7.

Figure 7:
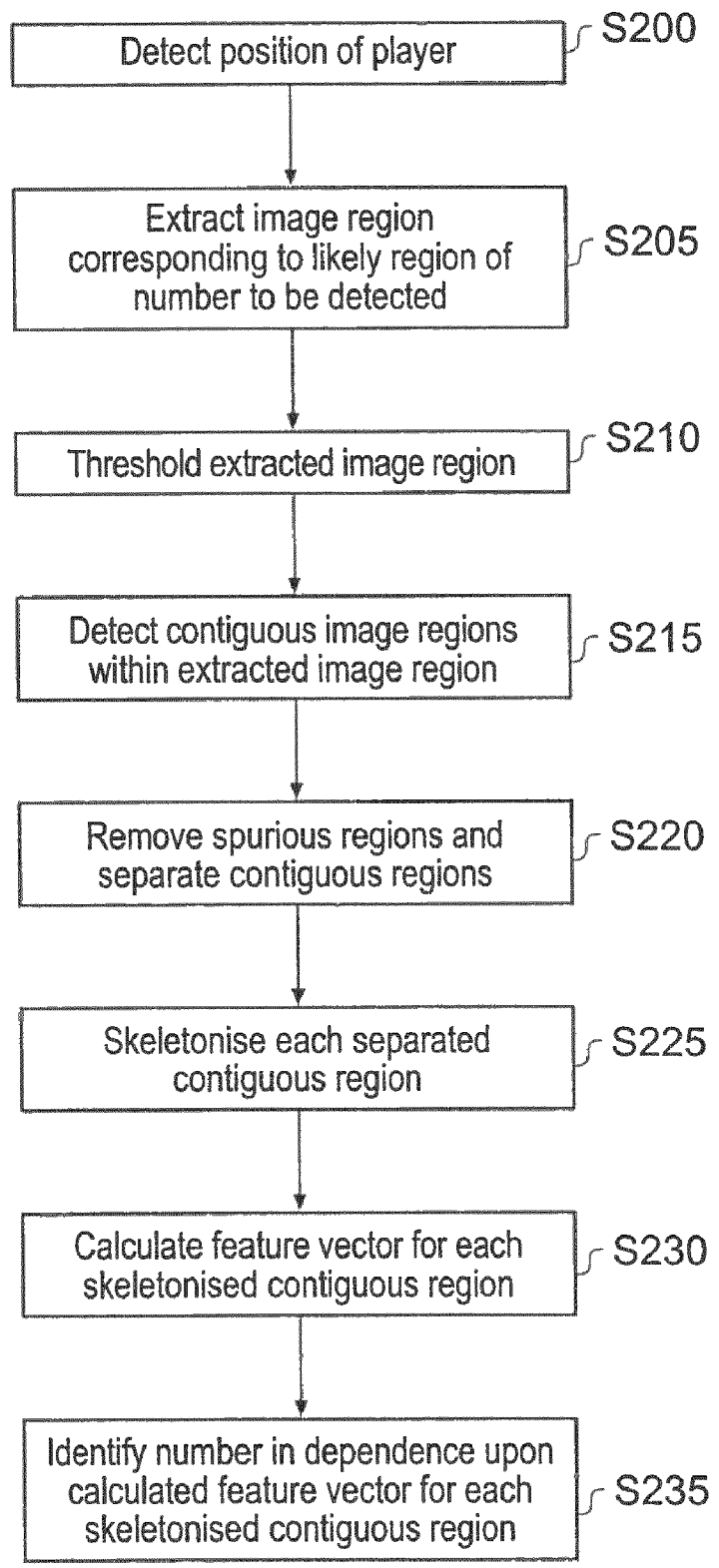
FIG. 7 shows a flow diagram of a method of image recognition in accordance with an embodiment of the present invention.

FIG. 7 shows a flow diagram of a method of image recognition in accordance with an embodiment of the present invention. In an embodiment of the present invention, one way of positively identifying a player is to detect and identify the number of the back of the player's shirt.

Accordingly, at a step s200, the position of at least one the players involved in an occlusion event is detected as described above with reference to FIGS. 3, 4a and 4b. In the embodiment described below, it is assumed that image recognition is only carried out on one of the players involved in the occlusion event although is will be appreciated that the described method may be more generally applicable to detecting and identifying at least one player at any time when they are within the field of view of the video camera 20.

Then, at a step s205, an image region corresponding to a likely region of the image area corresponding to the detected player is extracted. In an embodiment of the present invention, this is done by isolating the image region corresponding to the player's mask that was generated at the step s45 of FIG. 2 although it will be appreciated that other suitable methods could be used. Furthermore, the image region for which image recognition is to be carried out can be further refined in dependence upon known attributes of the object or image features to be detected. For example, in the case of a football player, it is known that the number identifying that player is usually printed on the back of the player's football shirt. The number printed on the back of the player's football shirt is an example of an image feature to be detected although it will be appreciated that other suitable image features could be detected.

By appropriately segmenting the image region that corresponds to the player's mask, the image region in which the desired attribute or image feature is most likely to be found can be extracted. However, it will be appreciated by the skilled person that other suitable methods may be used to select the image region for which image recognition is to be carried out. Extracting an image region in this way increases the ratio of useful information to redundant information within the image region as the feature to be identified is more likely to occupy a larger proportion of the image region. In one example, segmenting is performed by comparing the pixels to a threshold value and extracting or isolating those pixels which exceed the threshold value.

At a step s210, an image threshold is applied to the extracted image region so as to convert the selected image region into a binary image. Typically, the threshold is applied so as to generate a black and white threshold image although it will be appreciated that other image thresholds such as those based on colour could be used. In an embodiment of the invention, prior knowledge of the desired image feature to be recognised or some other feature of the image region can be used to generate the binary image. For example, the image threshold could be applied in dependence upon the colour of the player's shirt so as to produce the binary image. By using an image threshold that is based on prior knowledge of attributes of the feature or object to be recognised, differentiation between the desired image feature to be recognised and the background can be improved, as well as reducing the likelihood that image features that do not correspond to the image feature to be recognised are included in the resultant threshold image.

Then, at a step s215, those image regions whose pixels are contiguous with each other are detected within the selected thresholded image region. The detected contiguous region is then assigned as a selected contiguous image region on which further image processing is to be carried out. Therefore, the step s215 detects pixels of the same type which are contiguous with each other. Here the phrase "same type" is taken to mean the colour of the pixel, luminosity of the pixel (i.e. the pixel attributes) and the like. In other words, a contiguous image region is an image region identified by those pixels being adjacent to each other and corresponding to the same class of pixel attributes identified in the segmentation. For example, in the case described above where the resultant threshold image is a black and white image, an image region corresponding to contiguous black pixels (i.e. those black pixels that are next to each other) may be detected and assigned as the selected contiguous image region.

At a step s220, any selected contiguous image regions that are unlikely to correspond to a character are removed as being spurious image regions, and the remaining selected contiguous image regions are processed so as to determined the number of characters to be recognised.

In an embodiment of the present invention, in order to remove the spurious image regions, different metrics are calculated in dependence upon the selected contiguous image regions based on size, shape, relative position, and location of the selected contiguous image regions within the extracted image region using known techniques. In the embodiments described above with reference to detecting a number from a football player's shirt, it is likely that there will be either one or two digits to detect. Therefore, for example, any selected contiguous image regions that are not at the same height as each other or do not have approximately the same size as each other are unlikely to be digits to be detected. Accordingly, those selected contiguous image regions that are unlikely to correspond to characters to be detected are discarded.

A confidence level of how likely the remaining selected contiguous image regions are to correspond to a predetermined number of characters is then generated using a Gaussian probability. In an embodiment of the invention, the remaining selected contiguous image regions are processed so as to determine whether they correspond to two characters or digits with reference to the football shirt example given above. If the confidence level does not exceed a predetermined threshold, then it is assumed that there is only one digit and any selected contiguous image feature within a central region of the extracted image region is selected for further image processing. However, if the remaining selected contiguous image regions do correspond to two digits, these are then separated and further image processing as described below is carried out in respect of each remaining selected contiguous image region. This reduces the number of different characters that need to be classified thus reducing a processing load on the content processing workstation 10. For example, where numbers are to be identified, only the numbers 0 to 9 need to be classified rather than 0-99 or 0-999 if the number recognition is carried out on all the remaining selected contiguous image regions at once.

At a step s225, the selected contiguous image regions separated at the step s220 are skeletonised. This is a process whereby the contiguous region is reduced in width to a line width of only a few pixels. Typically, the reduced line width is one pixel wide. The number of pixels is predetermined by the skeletonising process and is dependant on the desired image feature to extract. A suitable skeletonisation process is described in Thierry M. Bernard, Antoine Manzanera, "Improved Low Complexity Fully Parallel Thinning Algorithm," 10th International Conference on Image Analysis and Processing (ICIAP '99), 1999, pp. 215-220. The advantage of skeletonising the contiguous image region is that it reduces the complexity of the shape thus simplifying any further processing steps. For example, substantially the same shape will be produced by skeletonisation of numbers regardless of the font used. The skeletonisation of a selected contiguous image region is illustrated with reference to FIG. 8. Carrying out skeletonisation on only those selected contiguous image regions that are determined likely to correspond to characters to be detected reduces an amount of image processing that has to be carried out by the content processing workstation 10.

Figure 8:
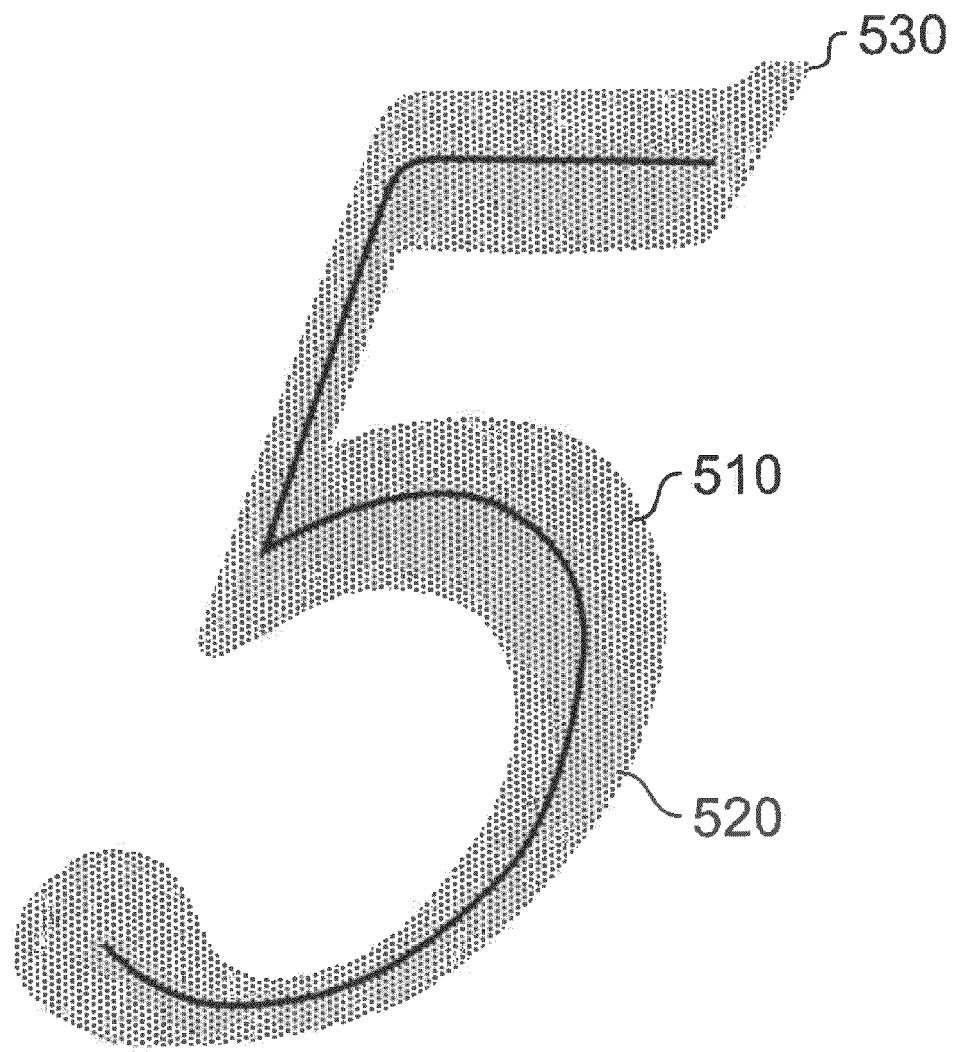
FIG. 8 shows a schematic diagram of image processing of an image feature in accordance with an embodiment of the present invention.

FIG. 8 shows a schematic diagram of image processing of a selected contiguous image feature in accordance with an embodiment of the present invention. In the embodiment illustrated in FIG. 8, the image feature to be detected and recognised is the number 5. After image processing according to the steps s200 to s220, a selected contiguous image region 510 is extracted for skeletonisation. After skeletonisation, the image feature 510 is reduced so that it is only one pixel wide, thus forming a modified width image feature 520 on which further processing may be carried out. As can be seen from FIG. 8, the complexity of the image feature is reduced. The variations in width of the number 5 and individual features of the font such as the font feature 530 is removed as the modified width image feature is only one pixel wide.

In an embodiment of the present invention, once the selected contiguous image region has been thinned (skeletonised) to a one pixel thick line, it is then dilated or thickened to a predetermined pixel width so that there are more pixels within the selected contiguous image region from which to extract a feature vector at a step s230.

Then, for each separate selected contiguous image region, a feature vector for that image region is calculated at the step s230. Typically this is done using Zernike moments as the resultant output is rotationally and scalar invariant. This is advantageous as it allows substantially the same feature vector to be extracted from the image even though the character to be recognised could be distorted in some way such as could happen, for example, on a player's shirt as the cloth is not rigid. However, it will be appreciated by the skilled person that other suitable rotational and scalar invariant methods of calculating feature vectors from image features could be used.

In an embodiment of the present invention, to extract the feature vector for the selected contiguous image region, the centre of mass of this region is calculated using known techniques. The centre of mass is used as the origin for calculating the Zernike moments. Additionally, a pixel having the greatest distance from the origin within the extracted image region is detected, and the detected distance normalised to unity so as to assist in the calculation of the Zernike moments. The Zernike polynomials used in the moment calculation are given by:

$$^{odd}U_n^m(\rho,\phi) = R_n^m(\rho)\sin(m\phi)$$

$$^{even}U_n^m(\rho,\phi) = R_n^m(\rho)\cos(m\phi)$$

(for example, see http://mathworld.wolfram.com/Zernike-Polynomial.html). Here, $\rho$ is the radial distance from the origin with $0 \leq \rho \leq 1$, $\phi$ is the azimuthal angle with $0 \leq \phi \leq 2\pi$, and n and m are positive integers. $R_n^m(\rho)$ is defined for the integers m and n with $n \geq m \geq 0$ by $$R_n^m(\rho) = \begin{cases} \sum_{l=0}^{\frac{(n-m)}{2}} \frac{(-1)^l (n-l)!}{l! \left[\frac{1}{2}(n+m) - l\right]! \left[\frac{1}{2}(n-m) - l\right]!} \rho^{n-2l} & \text{for } n-m \text{ even} \\ 0 & \text{for } n-m \text{ odd} \end{cases}$$

The Zernike moments are calculated for each pixel position within the extracted image region and then summed over the extracted image region to generate the feature vector. The resultant feature vector has as many elements as polynomials used in the moment calculation. An example of a feature vector is shown below.

Polynomial Feature Vector $$\begin{array}{c} U_1^1(\rho,\phi) \\ U_2^0(\rho,\phi) \\ U_2^2(\rho,\phi) \\ U_3^1(\rho,\phi) \\ U_3^3(\rho,\phi) \\ \vdots \\ U_n^m(\rho,\phi) \end{array} \quad \begin{pmatrix} x_1 \\ x_2 \\ x_3 \\ x_4 \\ x_5 \\ \vdots \\ x_l \end{pmatrix}$$

Here, the polynomial that has been used to calculate the moment by summing over the pixels of the selected contiguous image region is shown in the column headed "Polynomial" with the resultant value of the moment calculation $x_i$ being an element of the generated feature vector. Typically, the Zernike polynomials from $U_1^1(\rho,\phi)$ to $U_7^7(\rho,\phi)$ are used to generate the feature vector, as this provides a good balance between computational complexity and generating a feature vector that has a sufficient number of elements to disambiguate the characters from each other when classification is carried out. However, it will be appreciated that other ranges up to a different order could be used or that the moments calculated for selected polynomials.

As was mentioned above, in an embodiment of the present invention, once a selected contiguous image region has been skeletonised, it may then be thickened to a predetermined line width before the moment calculation is carried out. This reduces the sensitivity of the feature vector calculation to noise or variation in the skeletonised image region as small variations will tend to average out. A thickened selected contiguous image region used to calculate a feature vector in accordance with embodiments of the present invention is shown in FIG. 9.

Figure 9:
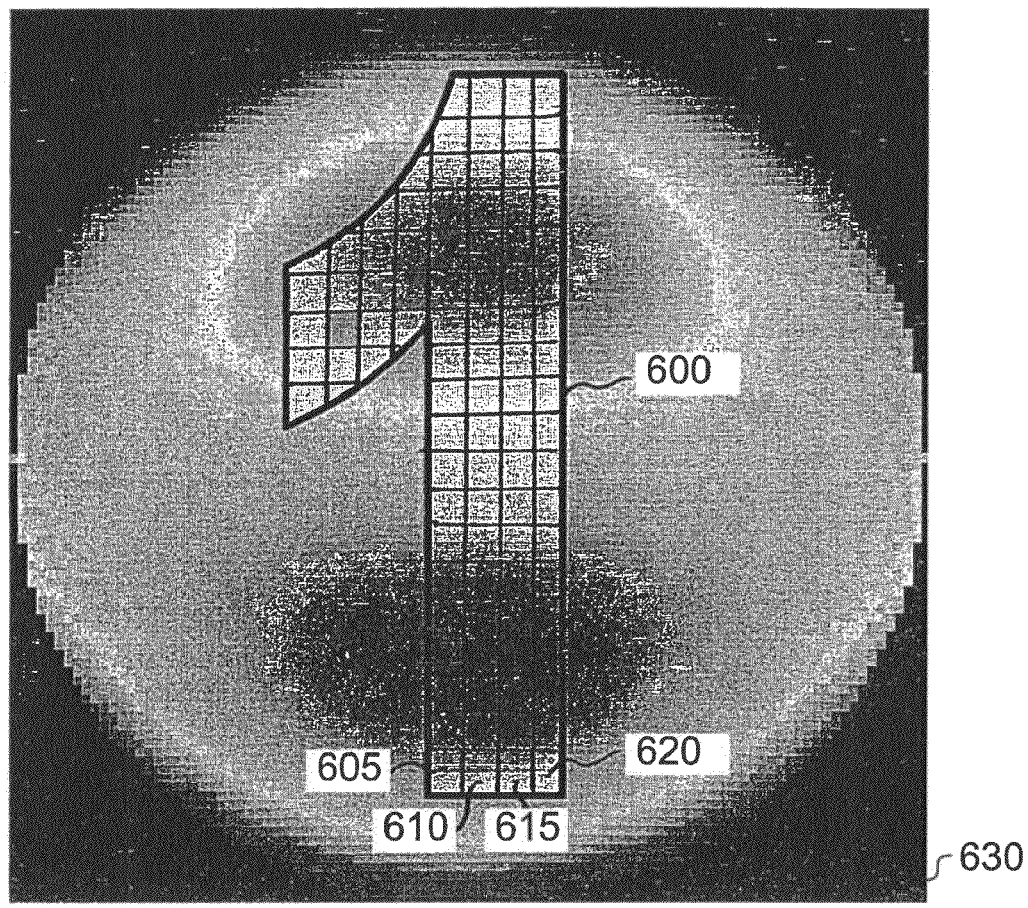
FIG. 9 shows a schematic diagram of image processing of an image feature so as to calculate a feature vector in accordance with an embodiment of the present invention.

FIG. 9 shows an example of a selected contiguous image region 600 that has been thickened before the feature vector is calculated. Here, the image feature 630 illustrates a plot of an example Zernike polynomial. The value of the Zernike polynomial is calculated at each pixel position within the image region 600 (for example, for pixels 605, 610, 615 and 620 which are shown for illustrative purposes only) as described above. The value of the calculated polynomial at each pixel position is then summed to give the Zernike moment for that polynomial and the image region 600. This resultant value is then used as an entry in the feature vector as illustrated above.

As an alternative to thickening the skeletonised contiguous image region to a predetermined line width, interpolation could be used to assist in expanding the number of sampled which are summed to form the Zernike moments.

At a step s235, the feature vector calculated at the step s230 is classified using a suitable classification method so as to detect to which character it is likely to correspond. In the example given above where numbers on player's shirts are to be identified, the possible characters are the numbers 0-9 although it will be appreciated that they could be any other suitable characters.

In an embodiment of the present invention, the feature vectors are classified using known neural network techniques so as to classify the generated feature vectors. The output of the neural network is then used to detect to which character the selected contiguous image region is likely to correspond.

In another embodiment, the feature vector generated at the step s230 is compared with feature vectors that have previously been generated from predetermined characters. The generation of the feature vectors for the predetermined characters is carried out using the same feature vector generation method as that in step s230 so that a comparison can be made between the predetermined characters and the detected image features to be identified. Preferably, the feature vector generation method is selected so as to produce significantly different feature vectors for each character so that the characters can be easily distinguished form each other in dependence upon their respective feature vector.

In this embodiment, a confidence value for each of the previously generated feature vectors is generated that indicates the similarity between the feature vector from the detected image feature generated at the step s230 with each of the previously generated feature vectors. For example, the feature vector generated from the skeletonised contiguous region shown in FIG. 8 (that is the reduced width image feature 520) is compared with feature vectors that have previously been generated from the numbers 0-9. If, when compared with one of the previously generated feature vectors, the confidence value for the reduced width image feature exceeds a predetermined threshold, then that reduced width image feature is identified as corresponding to the character that was used to generate the previously generated feature vector. For example, in the embodiment shown in FIG. 8, the number to be recognised is the number 5. If the confidence value generated from the comparison of the feature vector generated from the reduced width image feature 520 with the feature vector previously generated from an image of the number 5 exceeds the threshold amount, then the reduced width image feature 520 will be identified as the number 5.

In the event that confidence values generated from the comparison of the image feature with at least two different previously generated feature vectors exceed the predetermined threshold, then that identification is void and the process is repeated in respect of another frame received from the video camera 20.

Once a number or character has been recognised, the identification of each character can be combined together (in the case where the characters to be identified comprises two or more characters) so as to identify the number on the player's shirt. The identification of a number can then be used in conjunction with a look-up table stored on the HDD 740 or on media inserted in the BD-ROM drive 760 so as to identify the player. Once the player has been identified, this data can then be used at the steps s130 and s135 of FIG. 5 to update the association log. Additionally, in an embodiment of the present invention, once the content processing workstation 10 has identified an object, it can prompt an operator to verify the identification via a suitable operator interface.

Example Illustration

Figure 10:
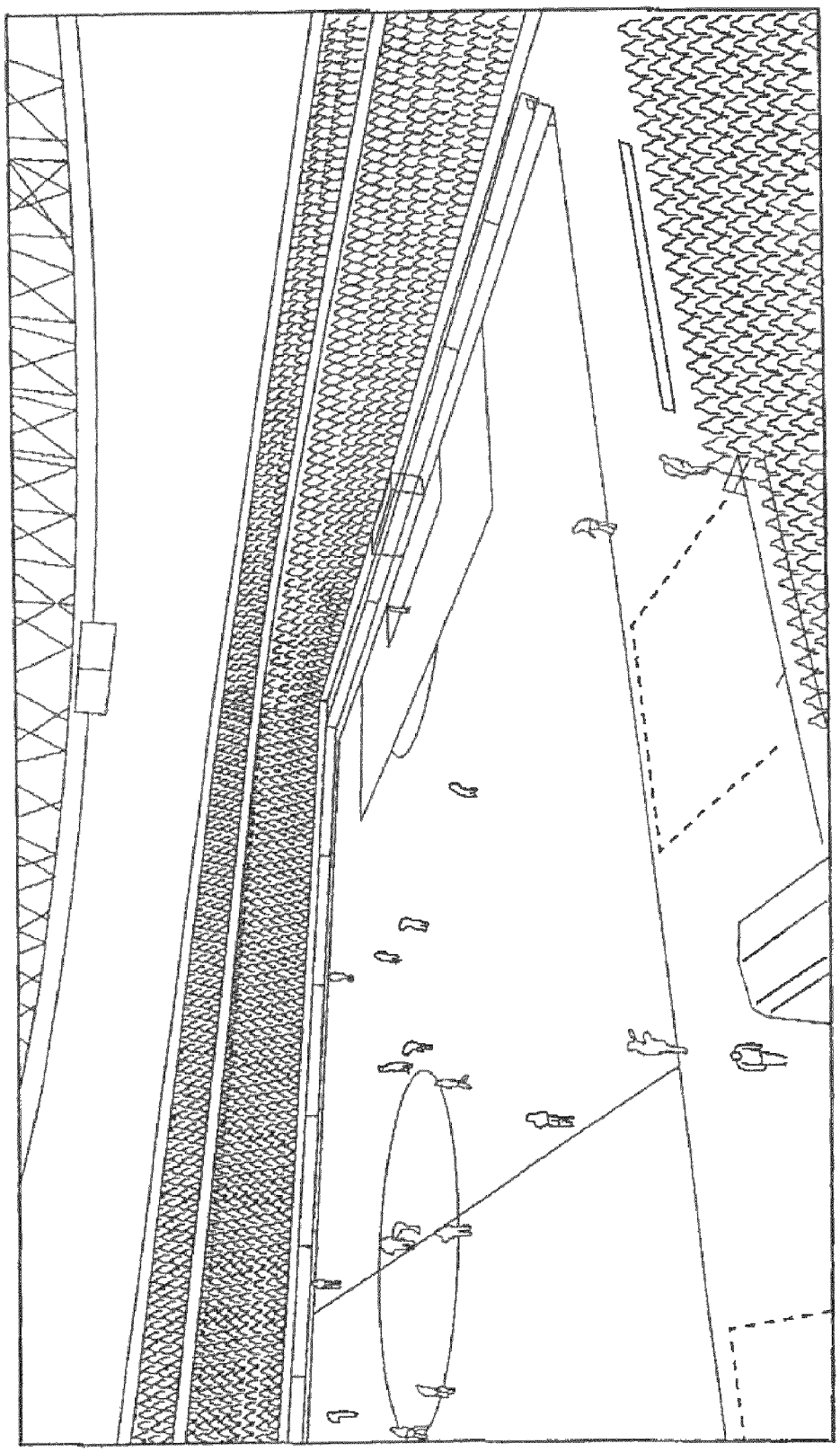
FIG. 10 is an illustration of a video image captured from a scene, which shows a football match with players to be tracked.
Figure 11A:
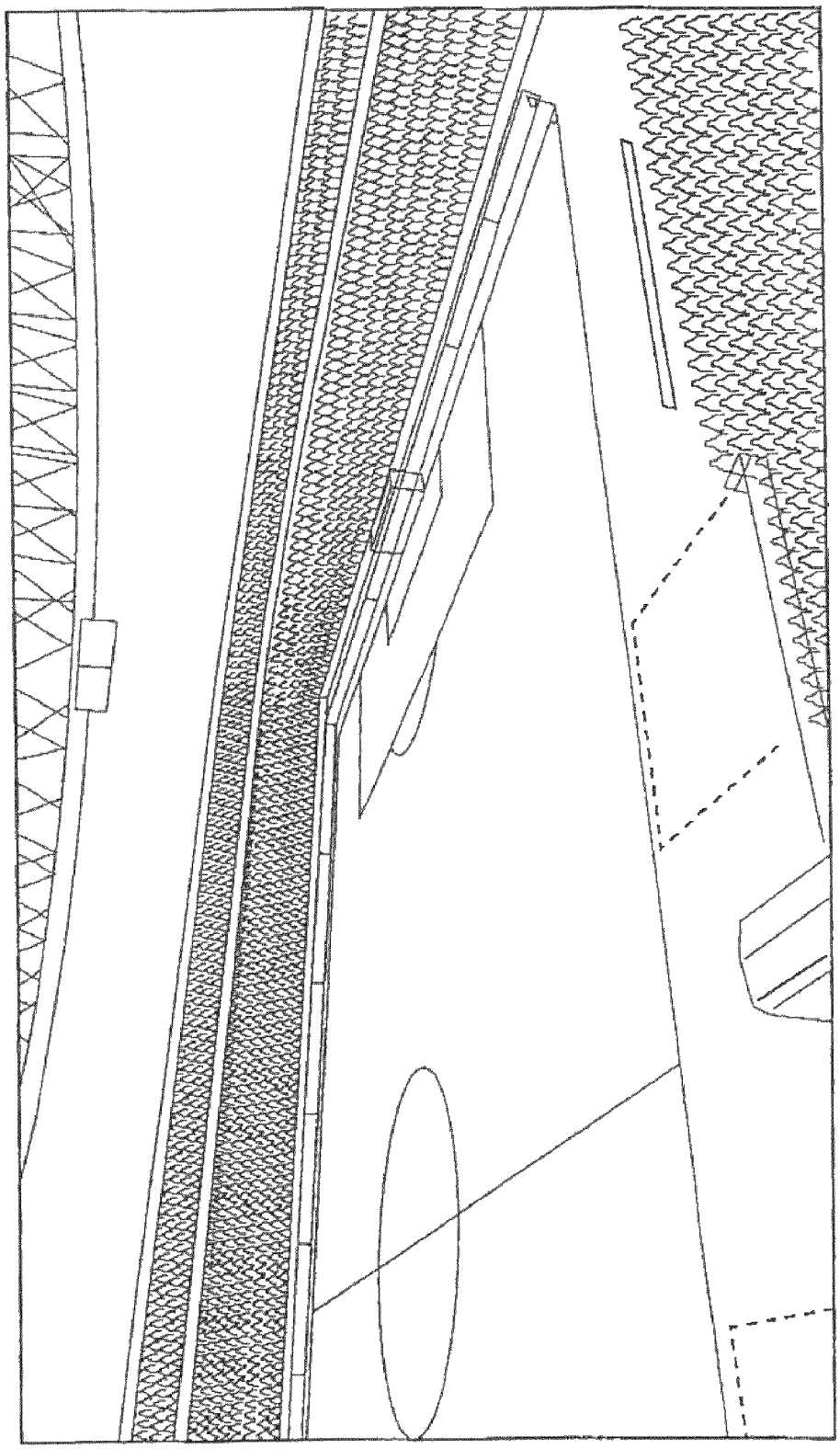
FIG. 11A is an illustration of a video image which has been processed in accordance with the present technique to produce a background model, by taking the mean
Figure 11B:
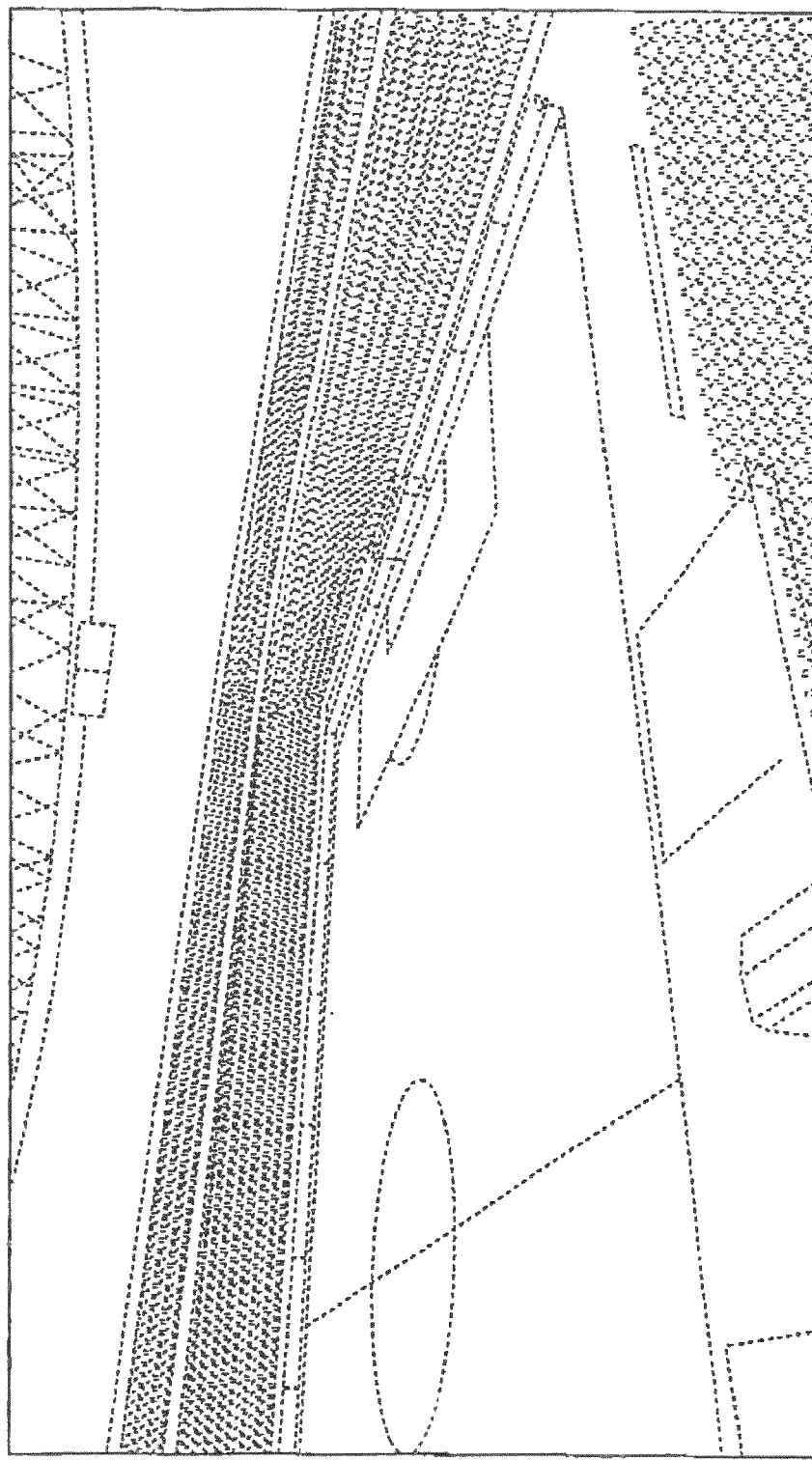
FIG. 11B shows the background model when considering the variance.
Figure 12:
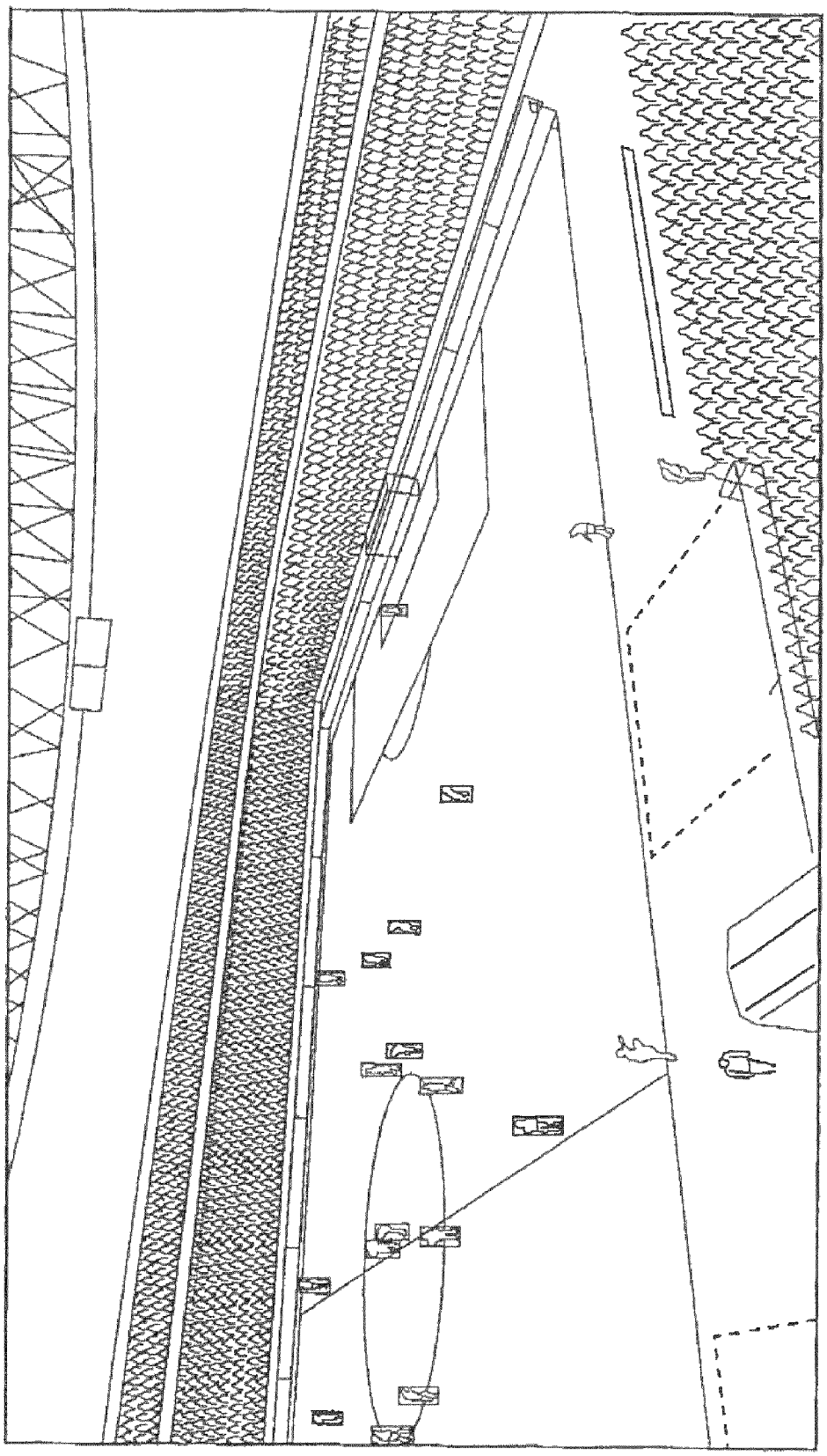
FIG. 12 is an illustration of a video image which has been processed in accordance with the present technique to show tracked positions of players.

FIGS. 10, 11A, 11B and 12 provide example illustrations of frames of example video images of a football match in which the present technique has been used to track players and produce a 3D model of the football match as a virtual model. FIG. 10 provides an example illustration of a video image produced by one HD camera of a football match. FIG. 11A provides an illustration of the video image of FIG. 9 in which the image has been processed to produce the background only using the mean value of each pixel, and FIG. 11B provides an illustration of the video image of FIG. 9 in which the image has been processed to produce the background only using the variance of each pixel in the image. FIG. 12 provides an illustration of a result of the tracking which is to provide a bounded box around each player in correspondence with the example shown in FIG. 3A.

Figure 13:
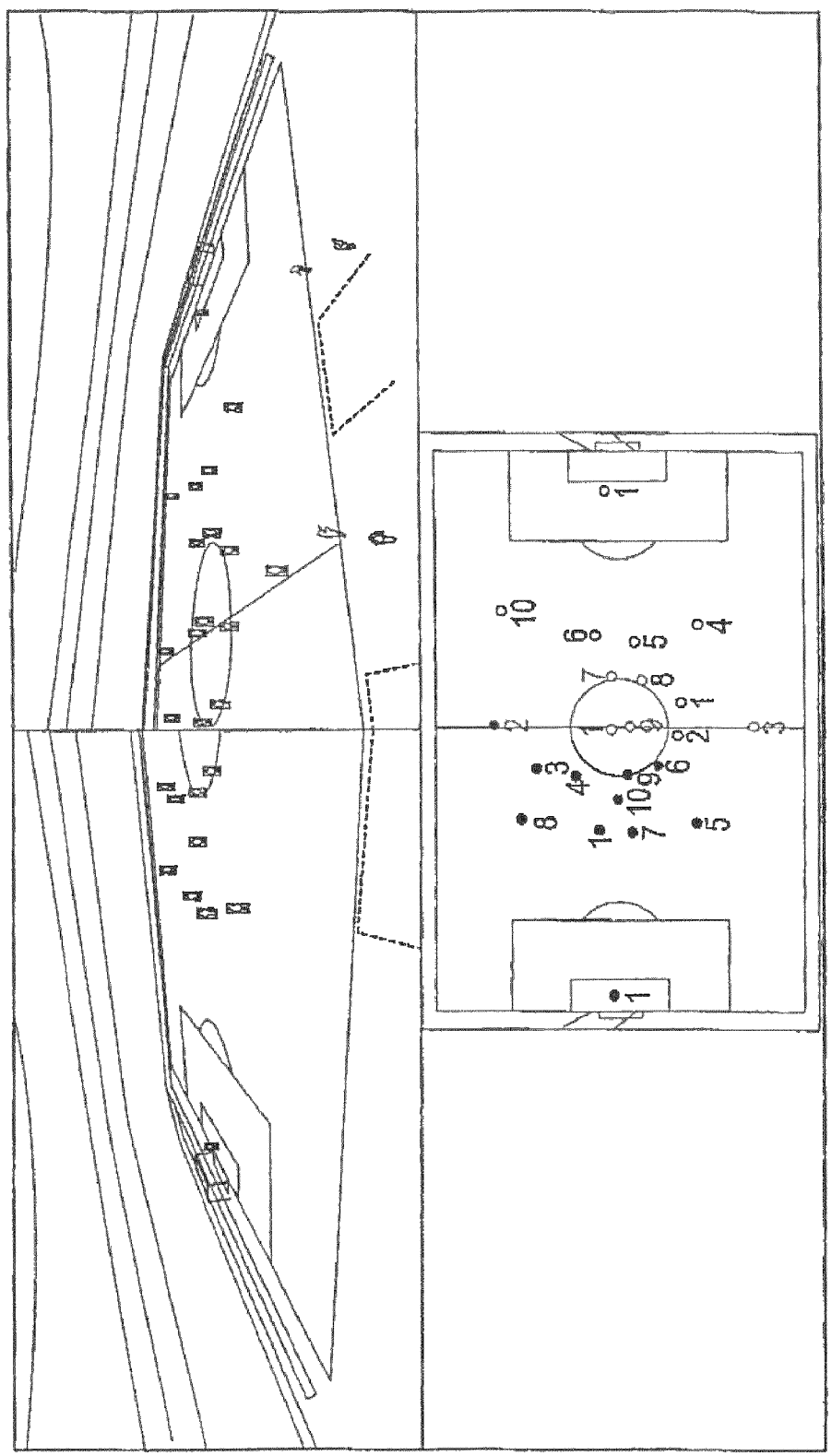
FIG. 13 is an illustration of two video images which have been captured from two different cameras, one for each side of the pitch and an illustration of a virtual representation of the football match in which the position of the players is tracked with respect to time.

FIG. 13 provides a corresponding illustration in which two cameras have been used (such as the cameras 22.1, 22.2) to generate video images each positioned respectively to view a different half of the pitch. In both the left half and the right half, the players are tracked as illustrated by the bounding boxes, which have been superimposed over each player.

In the lower half of FIG. 13, a virtual model of the football match has been generated to represent the position of the players, as numbered in accordance with their position on the pitch as viewed by the cameras in the two dimensional video images in the upper half of FIG. 13. Thus the 3D model view of the football match corresponds to the illustration of the virtual model shown in FIG. 3B.

Tracking Overlaid on Live Video

Figure 14:
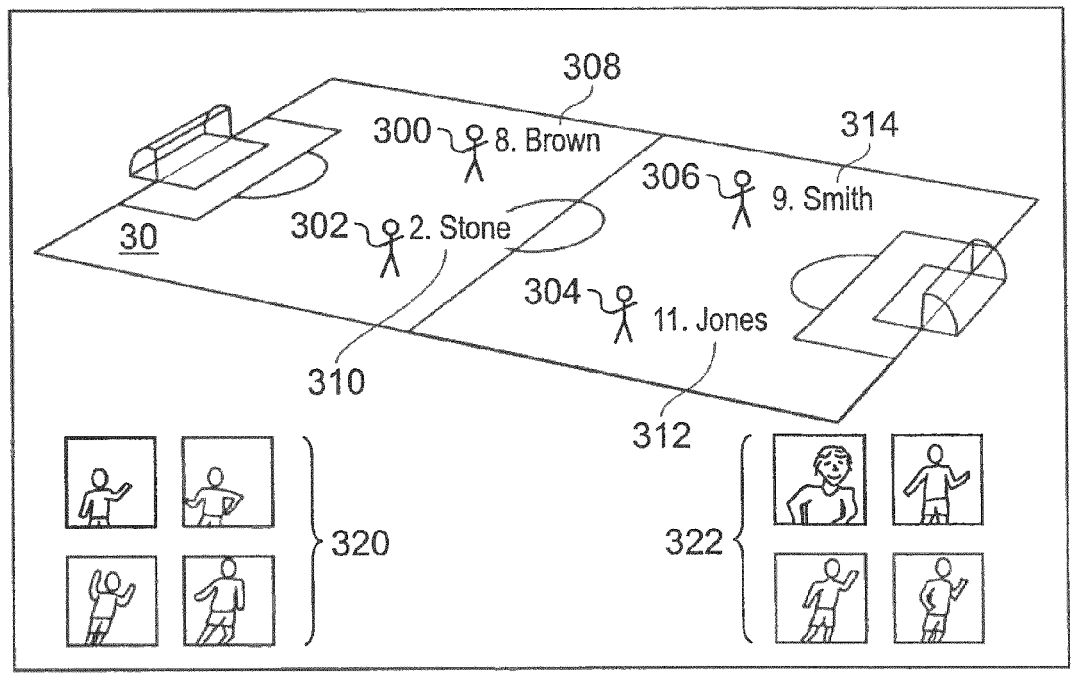
FIG. 14 is a representation of a video image of a football match in which the players which have been tracked in accordance with the present technique are labelled.

According to the present technique tracking information, which is generated with respect to a 3D model of a 2D image of a football match as described above, can be added to the video images captured by a video camera. An example is illustrated in FIG. 14. As illustrated in FIG. 3B, the 3D model of the football pitch is used to assist in the tracking and detection of the players on that football pitch. Once the relative position of the players have been detected from the 3D model then a mask for that player is then projected onto the 2D image and used to assist in the detection and tracking of the players within the 2D image. However, once a player's position has been identified with a relatively high probability then the position of that player within the 2D video image of the camera is known. Accordingly, a graphic illustrating an identity of that player, as estimated by the tracking algorithm, can be overlaid on to the live video feed from the camera by the content processing workstation 10. Thus, as shown in FIG. 14, each of the players 300, 302, 304, 306 is provided with a corresponding label 308, 310, 312, 314 which is then used to follow that player around the pitch in order to track the identity of that player. Thus, having tracked the objects using the three dimensional model of the plane on which the objects are disposed, the relative position of the identified objects are projected back into the video images and a graphical label or identifier or other effect introduced, so that identifiers of the players can be viewed in the live or processed video images.

Therefore in some examples a method according to the present technique comprises enhancing video images of a scene, which includes a plurality of objects disposed on a plane produced from a view of the scene by a video camera, the method comprises:

processing the captured video images so as to extract one or more image features from each object, comparing the one or more image features with sample image features from a predetermined set of possible example objects which the video images may contain, identifying the objects from the comparison of the image features with the stored image features of the possible example objects, generating object path data, which includes object identification data for each object which identifies the respective object; and provides a position of the object on the plane in the video images with respect to time;

calculating a projection matrix for projecting the position of each of the objects according to the object path data from the plane into a three dimensional model of the plane, identifying each of the objects in the video images using the object path data with respect to the three dimensional model of the plane on which the objects are disposed, generating a graphical representation of an identifier which identifies each of the objects in the video images, and overlaying the identifier on the objects in the video images to the effect that one or more of the objects is provided with an identifier as the objects move on the plane in the video images.

Also shown within an image view in FIG. 14 are two sets of extracted images 320, 322. Each of the sides on the football pitch is provided with one of the sets of extracted images 320, 322. Each image is an isolated section of the image provided from the camera 20, which aims as far as possible to isolate that player on the football pitch. Thus, having identified each of the players, then the image of that player within the video image can be extracted and displayed with other players within each of the sets corresponding to each of the teams on the football pitch. This presentation of the extracted images can provide an automatic isolation of a view of a particular player without a requirement for a separate camera to track that player throughout the football match. Thus, a single camera can be used to capture the entire football pitch, and each of the players can be tracked throughout the match as if the multiple cameras had been used to track each player. As a result, a significant reduction in expense and system complexity can be achieved.

Switching Between Real and Virtual Images

As explained above, with reference to FIGS. 3A and 3B, the process of tracking each of the players utilises a 3D model of the football pitch in order to assist in the identification and location of the players. Having gathered information as to an estimation of the position of the players and tracked that information between each of the frames of the video images (object path data), it is possible to create a virtual representation of the live video images by synthesising images of each of the players and representing those players within the 3D model. Furthermore, a relative position of a view of the model or synthesised camera position within the virtual space can be adjusted using known techniques to adapt the relative view of the 3D model of the football pitch. Thus, for each of the positions of the players with respect to time as determined from the image view produced by the camera, it is possible to recreate a virtual 3D view of that live football match from a desired position of the camera.

Figure 15:
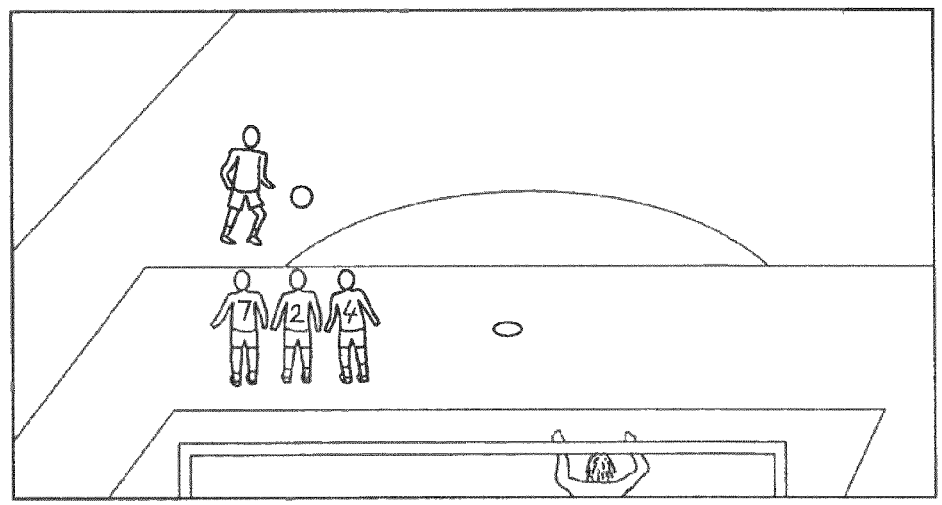
FIG. 15 is a three dimensional representation of a virtual model of a football match in which a view of the match can be changed.

As illustrated in an example shown in FIG. 15, a 3D model has been synthesised by applying the path data for each player to the 3D model (as illustrated in FIGS. 3B and 13) and the players have been represented by a model of each player at a position which changes with respect to time. Furthermore, since the view of the 3D model can be changed, a relative position of the camera can be altered in order to provide a view of the match at a position where in reality there is no camera present. Thus, as an example, if a free kick has been awarded, as shown in FIG. 15, the relative position of the camera can be provided from behind the goal in order to provide a view of the free kick at a position where in reality there is no camera present.

This is achieved as described above using the projection matrix P and mapping the relative position in 3D of the camera position from the corners of the pitch. Furthermore, having estimated a relative orientation of each player as described above, then this relative orientation can also be provided with the path data for each player, and the synthesised model of the player can be displayed with that orientation, which will change with respect to time. Thus, the orientation of the player which is identified as part of the tracking process described above is provided with the path data to generate the 3D model of the football match and this orientation data is used to change the orientation of the player in the model as this corresponds to the real image.

IPTV for User Determination of Content

Figure 16:
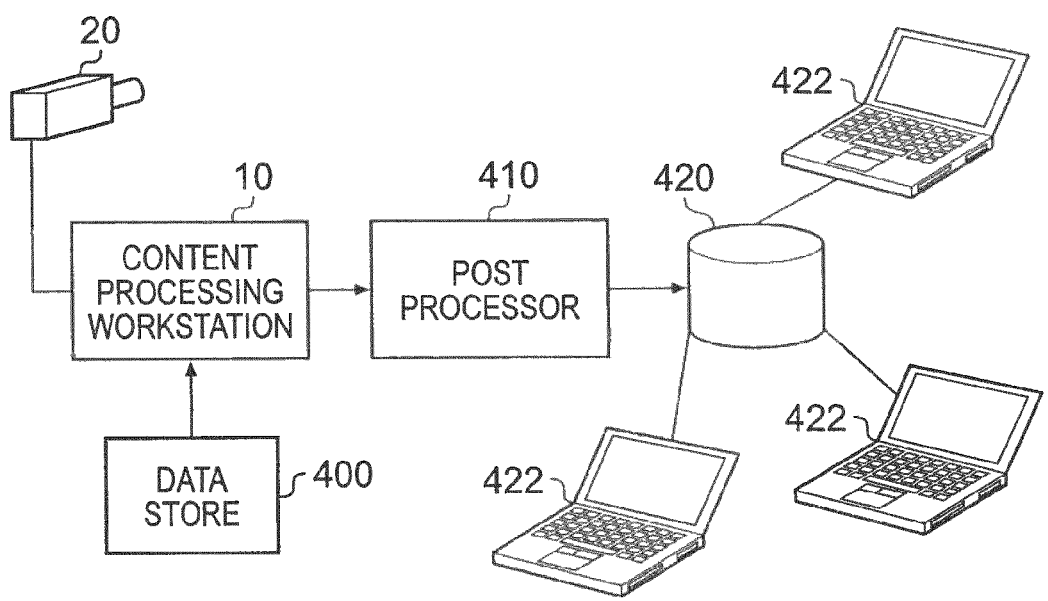
FIG. 16 is a schematic block diagram of a system for making a virtual model of the football match in which play is represented by synthesised elements available to client devices via an internet.

A further example embodiment of the present invention is illustrated in FIG. 16. As indicated above, it is possible to synthesise a 3D virtual model of a real football match by using the tracking information (object path data) generated using the tracking algorithm and applying synthesised representations of each of the players in combination with their relative orientation as indicated by the orientation lines in FIG. 3B in order to generate a representation of the actual live football match. In effect, therefore this represents a form of compression since the live video images are represented by a synthesised form in three dimensions by replacing the tracked position of the players on the football pitch with synthesised models. As such, a representation of the football match in accordance with a 3D virtual model can be streamed via the internet to client devices. Such an arrangement is shown in FIG. 16 where the content processing workstation 10 receives data from a data store 400, the data providing pre-generated synthesised representations of the football players. The representations could also include information pertaining to a posture, attitude or demeanour of each of the players in order to enhance the virtual representation of the football match. Thus the path data produced from the tracking process described above could be augmented to include information relating to a player's posture, attitude or demeanour and this information used to select a corresponding synthesised model of the player.

Having received the synthesised representations from the data store 400, the content processing workstation 10 can generate the 3D virtual representation of the football match and optionally pass the data representing the 3D virtual model to the post processing device 410. The post processor 410 could be used to package the information associated with the 3D virtual model of the football match for streaming to a distribution server 420.

In FIG. 16 each of the plurality of client processors 422 can request a particular view of the 3D virtual model of the football pitch by selecting options relating to a preferred team or a preferred view of a particular player, which are then fed to the distribution server 420. The distribution server 420 can then arranged to stream data representative of the 3D virtual model of the football match in accordance with the preferred options provided by the client terminals 422. The client terminals 422 can then reproduce their preferred view of the 3D virtual model providing effectively a compressed version of the live video images produced by the camera 20. Thus data for recreating a 3D model of the football match can be streamed to client devices, which provides a low bandwidth version of a live or near live football match. This data may simply include the object path data providing the tracking of the position of each player with respect to time, and may include the orientation of each player. The 3D model of the football pitch could be generated by the application software at the client terminals, which load synthesised models of the players and apply the path data to create the 3D model of the football match. Alternatively, the 3D model could be used to create a computer game, which replays or recreates a real match.

As will be appreciated, various modifications may be made to the embodiments described above without departing from the scope of the present invention as defined in the appended claims. For example, although the example embodiments have been illustrated with reference to a football match, it will be appreciated that any other sporting event or entertainment event such as theatre could be viewed to apply the techniques disclosed above. Furthermore, other processors other than the Cell processor could be used to perform the technique. Processes according to the present technique, may be implemented in the form of a computer program product comprising processor-implementable instructions stored on a data carrier such as a floppy disk, optical disk, hard disk, PROM, RAM, flash memory or any combination of these or other storage media, or transmitted via data signals on a network such as an Ethernet, a wireless network, the internet, or any combination of these or other networks.

The invention claimed is:

1. A method of generating a three dimensional representation of a scene, which includes a plurality of objects disposed on a plane, the three dimensional representation being generated from one or more video images of the scene, which video images include the objects on the plane produced from a view of the scene by a video camera, the method comprising:
   processing the captured video images so as to extract one or more image features from each object;
   comparing the one or more image features with sample image features from a predetermined set of possible example objects which the video images may contain,
   identifying the objects from the comparison of the image features with the stored image features of the possible example objects;
   generating object path data, which includes object identification data that identifies each of the objects, and which provides a position of each of the objects on the plane in the video images with respect to time; and
   calculating a projection matrix for projecting the position of each of the objects according to the object path data from the plane into a three dimensional model of the plane, for generating the three dimensional representation of the scene, by projecting the position of the objects according to the object path data into the plane of the three dimensional model of the scene using the projection matrix.

2. The method as claimed in claim 1, further comprising:
   generating the three dimensional representation of the scene which includes a synthesised representation of each of the plurality of objects on the plane, by projecting the position of the objects according to the object path data into the plane of the three dimensional model of the scene using the projection matrix and a predetermined assumption of the height of each of the objects or a simulated distance of a camera viewing the three dimensional representation.

3. The method as claimed in claim 1, further comprising changing a relative view point of the generated three dimensional model in response to a user control, when displayed to the user on a display screen.

4. The method as claimed in claim 1, wherein
the generating object path data includes
   generating for each object an indication of a relative orientation of the object in the plane, and
   including the indication of the relative orientation in the object path data, and
the generating the three dimensional representation of the scene includes orientating the synthesised objects in the plane of the three dimensional model using the indication of the orientation provided with the object path data.

5. The method as claimed in claim 1, wherein
each of the objects is a human being,
the generating the object path data includes
   generating for each object an indication of a relative attitude, posture or demeanour of the human beings in the plane, and
   including the indication of the relative attitude, posture or demeanour of the human beings in the object path data, and
the generating the three dimensional representation of the scene includes
   accessing a data store, which includes a set of representations of each of the human beings in the video images, each of the representations in the set corresponding to one of the possible indications of the relative attitude, posture or demeanour of the human beings in the object path data, and
   selecting a representation of each of the human beings from the set of possible representations of each of the human beings in accordance with the indication of the relative attitude, posture or demeanour of the human beings in the object path data and generating the selected representation in the plane of the three dimensional model at the position and the orientation according to the object path data.

6. The method as claimed in claim 1, wherein the projection matrix is determined in accordance with $$\begin{bmatrix} x \\ y \\ 1 \end{bmatrix} = \begin{bmatrix} P_{00} & P_{01} & P_{02} & P_{03} \\ P_{10} & P_{11} & P_{12} & P_{13} \\ P_{20} & P_{21} & P_{22} & P_{23} \\ 0 & 0 & 0 & 1 \end{bmatrix} \begin{bmatrix} x' \\ y' \\ z' \\ w \end{bmatrix}$$

wherein x, y are coordinate values representing the position of an object in the plane of the two dimensional video image and x', y', z', w provide a zoom level, focal centre, three dimensional position and three dimensional rotation vector for a view of the object in the three dimensional model.

7. The method as claimed in claim 1, further comprising:
   identifying each of the objects in the video images using the object path data with respect to the three dimensional model of the plane on which the objects are disposed;
   generating a graphical representation of an identifier which identifies each of the objects in the video images; and
   overlaying the identifier on the objects in the video images to the effect that one or more of the objects is provided with an identifier as the objects move on the plane in the video images.

8. The method as claimed in claim 1, further comprising:
   generating the three dimensional model of the plane on which the objects are disposed; and
   calibrating the plane in the generated model to the video image of the plane using the corners of the plane.

9. The method as claimed in claim 1, wherein the objects are players of a sports game, and the plane is a field of play.

10. A non-transitory data carrier comprising computer readable instructions that when executed by a computer, cause the computer to carry out the method in accordance with claim 1.

11. An image processing apparatus operable to generate a three dimensional representation of a scene which includes a plurality of objects disposed on a plane, the three dimensional representation being generated from one or more video images of the scene, which video images include the objects on the plane produced from a view of the scene by a video camera, the image processing apparatus comprising a data processor operable to process the captured video images so as to extract one or more image features from each object,
  to compare the one or more image features with sample image features from a predetermined set of possible example objects which the video images may contain,
  to identify the objects from the comparison of the image features with the predetermined image features of the possible example objects,
  to generate object path data, which includes object identification data for each object which identifies the respective object, and which provides a position of the object on the plane in the video images with respect to time, and
  to calculate a projection matrix for projecting the position of each of the objects according to the object path data from the plane into a three dimensional model of the plane, for generating the three dimensional representation of the scene, by projecting the position of the objects according to the object path data into the plane of the three dimensional model of the scene using the projection matrix.

12. The image processing apparatus as claimed in claim 11, wherein the data processor is operable to generate the three dimensional representation of the scene which includes a synthesised representation of each of the plurality of objects on the plane, by projecting the position of the objects according to the object path data into the plane of the three dimensional model of the scene using the projection matrix and a predetermined assumption of the height of each of the objects or a simulated distance of a camera viewing the three dimensional representation.

13. The image processing apparatus as claimed in claim 11, further comprising:
  a user interface for providing user control signals to the data processor, representative of a change of the view of the three dimensional model,
  wherein the data processor is operable to change a relative view point of the generated three dimensional model, in response to the user control signals, when the representation of the three dimensional model is displayed on a display screen.

14. The image processing apparatus as claimed in claim 11, wherein
  the data processor is operable
    to generate for each object an indication of a relative orientation of the object in the plane, and
    to include the indication of the relative orientation in the object path data, and
  the generating the three dimensional representation of the scene includes orientating the synthesised objects in the plane of the three dimensional model using the indication of the orientation provided with the object path data.

15. The image processing apparatus as claimed in claim 11, wherein
  each of the objects is a human being,
  the data processor is operable
    to generate for each object an indication of a relative attitude, posture or demeanour of the human beings in the plane, and
    to include the indication of the relative attitude, posture or demeanour of the human beings in the object path data, and
  the generating the three dimensional representation of the scene includes
    accessing the data store, which includes a set of representations of each of the human beings in the video images, each of the representations in the set corresponding to one of the possible indications of the relative attitude, posture or demeanour of the human beings in the object path data, and
    selecting a representation of each of the human beings from the set of possible representations of each of the human beings in accordance with the indication of the relative attitude, posture or demeanour of the human beings in the object path data and generating the selected representation in the plane of the three dimensional model at the position and the orientation according to the object path data.

16. The image processing apparatus as claimed in claim 11, wherein the data processor is operable
  to identify each of the objects in the video images using the object path data with respect to the three dimensional model of the plane on which the objects are disposed,
  to generate a graphical representation of an identifier which identifies each of the objects in the video images, and
  to overlay the identifier on the objects in the video images to the effect that one or more of the objects is provided with an identifier as the objects move on the plane in the video images.

17. A method of enhancing video images of a scene, which includes a plurality of objects disposed on a plane produced from a view of the scene by a video camera, the method comprising:
  processing the captured video images so as to extract one or more image features from each object;
  comparing the one or more image features with sample image features from a predetermined set of possible example objects which the video images may contain;
  identifying the objects from the comparison of the image features with the stored image features of the possible example objects;
  generating object path data, which includes object identification data for each object which identifies the respective object, and which provides a position of the object on a three dimensional model of the plane in the video images with respect to time;
  calculating a projection matrix for projecting the position of each of the objects according to the object path data from the plane into the three dimensional model of the plane;
  identifying each of the objects in the video images using the object path data with respect to the three dimensional model of the plane on which the objects are disposed;
  generating a graphical representation of an identifier which identifies each of the objects in the video images; and
  overlaying the identifier on the objects in the video images to the effect that one or more of the objects is provided with an identifier as the objects move on the plane in the video images.

18. An image processing apparatus operable to enhance video images of a scene, which includes a plurality of objects disposed on a plane produced from a view of the scene by a video camera, the image processing apparatus comprising a data processor operable:

to process the captured video images so as to extract one or more image features from each object, to compare the one or more image features with sample image features from a predetermined set of possible example objects which the video images may contain, to identify the objects from the comparison of the image features with the stored image features of the possible example objects, to generate object path data, which includes object identification data for each object which identifies the respective object; and provides a position of the object on a three dimensional model of the plane in the video images with respect to time, to calculate a projection matrix for projecting the position of each of the objects according to the object path data from the plane into the three dimensional model of the plane, to identify each of the objects in the video images using the object path data with respect to the three dimensional model of the plane on which the objects are disposed, to generate a graphical representation of an identifier which identifies each of the objects in the video images, and to overlay the identifier on the objects in the video images to the effect that one or more of the objects is provided with an identifier as the objects move on the plane in the video images.

19. An apparatus for generating a three dimensional representation of a scene, which includes a plurality of objects disposed on a plane, the three dimensional representation being generated from one or more video images of the scene, which video images include the objects on the plane produced from a view of the scene by a video camera, the apparatus comprising:

means for processing the captured video images so as to extract one or more image features from each object;

means for comparing the one or more image features with sample image features from a predetermined set of possible example objects which the video images may contain;

means for identifying the objects from the comparison of the image features with the stored image features of the possible example objects;

means for generating object path data, which includes object identification data for each object which identifies the respective object, and which provides a position of the object on the plane in the video images with respect to time; and means for calculating a projection matrix for projecting the position of each of the objects according to the object path data from the plane into a three dimensional model of the plane, for generating the three dimensional representation of the scene, by projecting the position of the objects according to the object path data into the plane of the three dimensional model of the scene using the projection matrix.

* * * * *